(12) United States Patent
Masuki

(10) Patent No.: US 10,652,460 B2
(45) Date of Patent: May 12, 2020

(54) IMAGE-CAPTURING APPARATUS AND IMAGE-CAPTURING CONTROL METHOD

(71) Applicant: CANON KABUSHIKI KAISHA, Tokyo (JP)

(72) Inventor: Akihiko Masuki, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 150 days.

(21) Appl. No.: 15/935,268

(22) Filed: Mar. 26, 2018

(65) Prior Publication Data
US 2018/0288323 A1  Oct. 4, 2018

(30) Foreign Application Priority Data

Mar. 30, 2017 (JP) ................... 2017-066490
Feb. 23, 2018 (JP) ................... 2018-030883

(51) Int. Cl.
*H04N 5/232* (2006.01)
*H04N 5/238* (2006.01)
*H04N 5/225* (2006.01)

(52) U.S. Cl.
CPC ....... *H04N 5/23238* (2013.01); *H04N 5/2251* (2013.01); *H04N 5/2256* (2013.01); *H04N 5/238* (2013.01); *H04N 5/23206* (2013.01); *H04N 5/23296* (2013.01)

(58) Field of Classification Search
CPC ............ H04N 5/23238; H04N 5/2251; H04N 5/2256; H04N 5/23206; H04N 5/23296; H04N 5/238
See application file for complete search history.

(56) References Cited

U.S. PATENT DOCUMENTS

| 9,258,550 | B1* | 2/2016 | Sieracki ............... H04N 13/296 |
| 2004/0066449 | A1* | 4/2004 | Givon ................... G03B 35/00 348/48 |
| 2004/0246333 | A1* | 12/2004 | Steuart, III ............ G03B 35/08 348/36 |

(Continued)

FOREIGN PATENT DOCUMENTS

JP  2015-194901 A  11/2015

*Primary Examiner* — Sinh Tran
*Assistant Examiner* — Zhenzhen Wu
(74) *Attorney, Agent, or Firm* — Cowan, Liebowitz & Latman, P.C.

(57) ABSTRACT

The image-capturing apparatus includes an image-capturing device configured to perform image capturing through multiple magnification-variable optical systems, which face in mutually different directions, to acquire multiple images to be continuously joined together, a controller configured to control magnification-varying operations of the respective magnification-variable optical systems to set field angles thereof, a main body holding the multiple magnification-variable optical systems, and a protrusion detector configured to detect a protruding member. The controller is configured to perform, depending on a detection result of the protrusion detector, a field angle setting process for setting the field angles of the respective magnification-variable optical systems such that the detected protruding member is not included in all the field angles of the magnification-variable optical systems.

9 Claims, 21 Drawing Sheets

(56) References Cited

U.S. PATENT DOCUMENTS

| | | | |
|---|---|---|---|
| 2014/0362176 A1* | 12/2014 | St. Clair | H04N 5/23238 348/36 |
| 2015/0207999 A1* | 7/2015 | Han | H04N 5/23296 348/240.3 |
| 2015/0373279 A1* | 12/2015 | Osborne | G02B 13/0075 348/36 |
| 2017/0227732 A1* | 8/2017 | Hayakawa | G02B 6/0051 |
| 2017/0322396 A1* | 11/2017 | Burtey | G02B 13/06 |
| 2019/0052812 A1* | 2/2019 | Wang | H04N 5/2254 |

* cited by examiner

IMAGE-CAPTURING APPARATUS AND IMAGE-CAPTURING CONTROL METHOD

BACKGROUND OF THE INVENTION

Field of the Invention

The present invention relates to an image-capturing apparatus performing wide-field-angle image capturing such as omnidirectional image capturing and panorama image capturing.

Description of the Related Art

As a method of performing the wide-field-angle image capturing, a method is known that joins together multiple captured images acquired by multiple cameras to produce a continuous single image. When the wide-field-angle image capturing is performed for monitoring in order to prevent crimes or the like, a specific object image is often enlarged from the captured image and observed in detail. Conventionally, in such a case, part of the captured image is clipped out and enlarged by electronic zoom. However, the electronic zoom has a problem that degrades image quality.

Japanese Patent Laid-Open No. 2015-194901 discloses an image-capturing system including two cameras that are a wide-angle camera capable of capturing an almost entire monitored area and a movable camera including a camera platform mechanism and capable of changing its image-capturing direction and its zoom magnification ratio in response to external signals. This image-capturing system specifies, from a wide-field image acquired by the wide-angle camera, a position of an object that is a tracked target, and controls the image-capturing direction and the zoom magnification ratio such that a high-resolution object tracking image can be acquired.

However, the image-capturing system disclosed in Japanese Patent Laid-Open No. 2015-194901 uses the wide-angle camera and the movable camera disposed away from each other, and therefore cannot acquire a wide-field image and an enlarged image of a specific object by a single camera.

Furthermore, cameras are proposed that are each capable of individually performing omnidirectional (spherical) image capturing of not only horizontal omnidirectional directions but also sky and ground directions at once. However, such omnidirectional cameras have a problem that a protruding member such as a tripod for supporting the camera is included in a captured image (omnidirectional image). In such a case, a conventional method first acquires an incomplete omnidirectional image in which a partial area including the protruding member is excluded, and then attaches, to the partial area of the incomplete omnidirectional image, another captured image not including the protruding member to acquire a complete omnidirectional image.

SUMMARY OF THE INVENTION

The present invention provides an image-capturing apparatus capable of individually performing wide-field-angle image capturing while avoiding or reducing an inclusion of a protruding member into a captured image.

The present invention provides as an aspect thereof an image-capturing apparatus including an image-capturing device configured to perform image capturing through multiple magnification-variable optical systems, which face in mutually different directions, to acquire multiple images to be continuously joined together, a controller configured to control magnification-varying operations of the respective magnification-variable optical systems to set field angles thereof, a main body holding the multiple magnification-variable optical systems, and a protrusion detector configured to detect a protruding member. The controller is configured to perform, depending on a detection result of the protrusion detector, a field angle setting process for setting the field angles of the respective magnification-variable optical systems such that the detected protruding member is not included in all the field angles of the magnification-variable optical systems.

The present invention provides as another aspect thereof an image-capturing apparatus including an image-capturing device configured to perform image capturing through multiple magnification-variable optical systems, which face in mutually different directions, to acquire multiple images to be continuously joined together, a controller configured to control magnification-varying operations of the respective magnification-variable optical systems to set field angles thereof, a main body holding the multiple magnification-variable optical systems, and a protrusion detector configured to detect a protruding member. The controller is configured to perform, depending on a detection result of the protrusion detector, a field angle setting process for setting the field angles of the respective magnification-variable optical systems so as to reduce an included amount of the detected protruding member in any one or more of the field angles of the magnification-variable optical systems.

The present invention provides yet another aspect thereof an image-capturing control method for performing image capturing through multiple magnification-variable optical systems, which face in mutually different directions, to acquire multiple images to be continuously joined together. The method includes the step of controlling magnification-varying operations of the respective magnification-variable optical systems to set field angles thereof, and the step of detecting a protruding member. In the step of setting the field angles, the method performs, depending on a detection result of the protrusion detector, a field angle setting process for setting the field angles of the respective magnification-variable optical systems such that the detected protruding member is not included in all the field angles of the magnification-variable optical systems.

The present invention provides as further another aspect thereof a non-transitory storage medium storing a computer program that causes a computer in an image-capturing apparatus to perform a process according to the above-described image-capturing control method.

Further features of the present invention will become apparent from the following description of exemplary embodiments with reference to the attached drawings.

DESCRIPTION OF THE EMBODIMENTS

Exemplary embodiments of the present invention will hereinafter be described with reference to the accompanying drawings.

Embodiment 1

Figure 1:
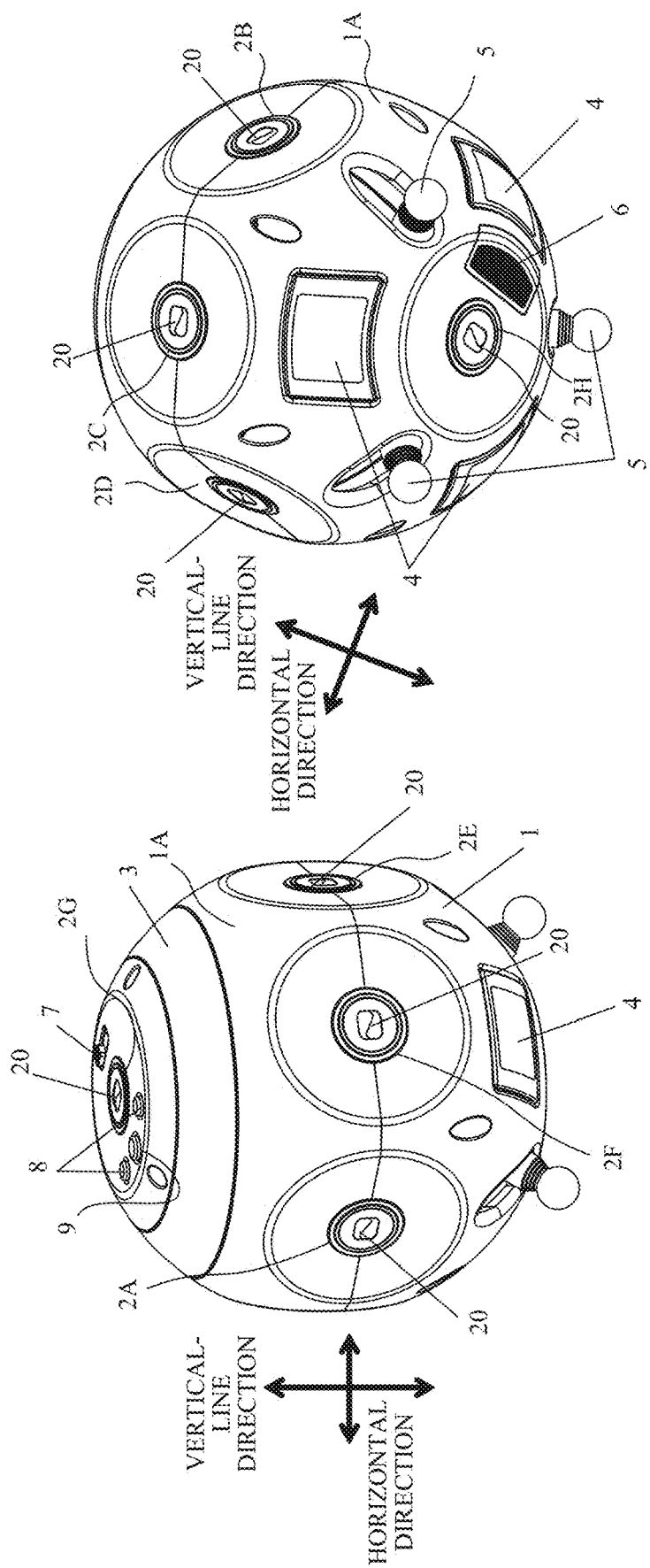
FIG. 1 is an external perspective view of an omnidirectional camera that is Embodiment 1 of the present invention.

FIG. 1 illustrates an exterior of an omnidirectional camera as an image-capturing apparatus that is an embodiment of the present invention. This omnidirectional camera acquires, by image capturing through multiple image-capturing optical systems that faces toward mutually different directions, multiple images (partial images), and joins the multiple images together to produce an omnidirectional image (joined image) that is a continuous single image of an image-capturing area over horizontal 360 degrees and vertical 360 degrees.

A camera body (main body) 1 has a spherical exterior member 1a. At six horizontal portions and two vertical portions (upper and lower portions) of the camera body 1, lens barrels 2 (2A to 2H) respectively housing image-capturing lenses are held (disposed) such that the image-capturing lenses face toward mutually different directions. Specifically, the lens barrels 2A to 2F face toward mutually different directions in a horizontal plane, and the lens barrels 2G and 2H face upward and downward, that is, toward mutually different directions in a vertical-line direction.

The vertical-line direction is a direction in which a straight line extends along gravity acting on the camera body 1 that is set on a horizontal camera setting plane by using a built-in tripod 5. The vertical-line direction is also called a vertical direction. A plane parallel to the vertical-line direction is called a vertical plane. The horizontal plane is a plane orthogonal to the vertical-line direction. Directions (azimuths) included in this horizontal plane are called horizontal directions. The image-capturing lenses in the eight lens barrels 2 in total are magnification-variable optical systems each capable of performing a magnification-varying (optical zoom) operation for changing its focal length. The magnification-variable optical system corresponds to the image-capturing lens in reality, but in the following description the magnification-variable optical system corresponds to the lens barrel including the image-capturing lens.

At a front end portion of each lens barrel 2, a lens barrier 20 is provided that opens and covers a front face of the image-capturing lens. The lens barrier 20 is opened and shut in interlock with lens barrel operations in response to ON and OFF of a power switch 7 for moving out from and retracting into the camera body 1 between a retracted state illustrated in FIG. 1 and a protruded state at which the lens barrel 2 protrudes from the camera body 1. The power switch 7 is provided in the upper portion of the camera body 1.

Furthermore, between the lens barrel 2 (2G) disposed in the upper portion of the camera body 1 and the six lens barrels 2 (2A to 2F) in the horizontal plane, a ring illuminator 3 that projects illumination light evenly to objects around the camera is provided. In addition, between the lens barrel 2 (2H) disposed in the lower portion of the camera body 1 and the six lens barrels 2 (2A to 2F) in the horizontal plane, three movable illumination units 4 and the built-in tripod (hereinafter simply referred to as "a tripod") 5 for stably setting the camera body 1 are provided. The movable illumination units 4 can be retracted into the camera body 1 as illustrated in FIG. 1 and protruded from the camera body 1 to arbitrarily adjusted illumination positions. The tripod 5 can be retracted into the camera body 1 as illustrated in FIG. 1 and has legs whose lengths and angles can be arbitrarily changed so as to allow adjusting height of the camera body 1 from the camera setting plane. The movable illumination units 4 and the tripod 5 that are protruded from the camera body 1 are protruding members.

In the lower portion of the camera body 1, a battery chamber 6 is provided. A battery housed in this battery chamber 6 supplies power to the camera body 1. On the other hand, in the upper portion of the camera body 1, a zoom button 8 is provided for selecting one or more of the eight lens barrels 2 that perform the optical zoom operation and instructing the optical zoom operation, and a release button 9 for causing the camera to start an image-capturing preparation operation (focusing and photometry operations) and an image-capturing operation (that is, exposure of image sensors described later).

The optical zoom operation, the image-capturing preparation operation and the image-capturing operation can be performed in response to remote control through communication from an external instruction device such as a personal computer or a smartphone.

Figure 2:
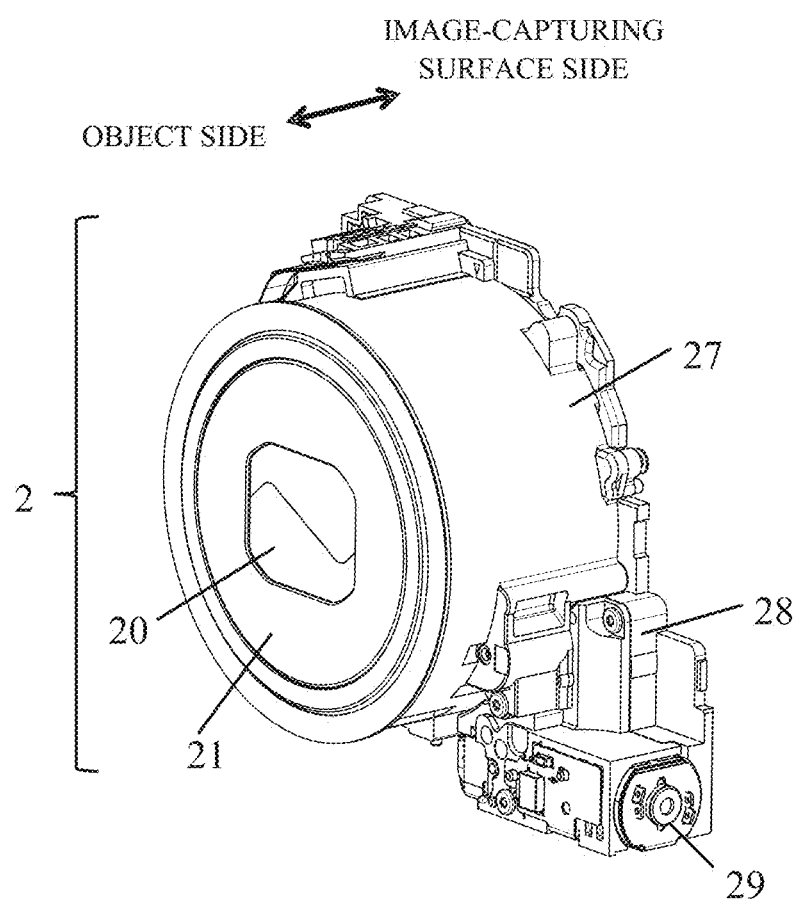
FIG. 2 is a perspective view of a lens barrel in Embodiment 1.

FIG. 2 illustrates one of the eight lens barrels 2 (2A to 2H) provided in the camera body 1. The lens barrel 2 is a retractable lens barrel that is retracted into the camera body 1 in a power-OFF state of the camera and is protruded outside from the camera body 1 for enabling image capturing in a power-ON state. In addition, in the power-OFF state the lens barrier 20 covers the front face of the image-capturing lens as described above, and thereby scratching on the front face and intrusion of dust into the lens barrel 2 are prevented.

Figure 3:
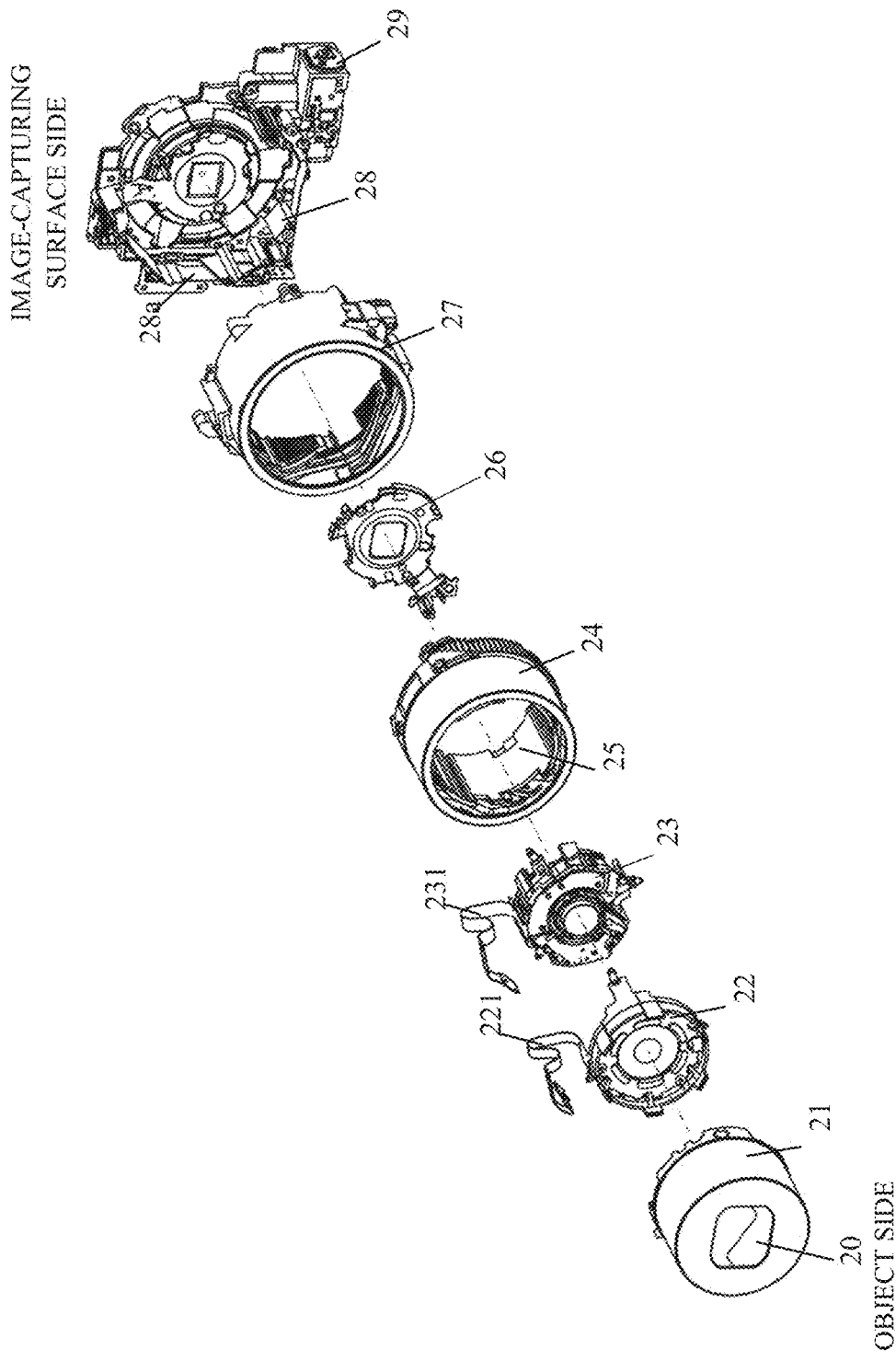
FIG. 3 is an exploded perspective view of the lens barrel in Embodiment 1.

FIG. 3 is an exploded view of the lens barrel 2. The image-capturing lens includes a first lens unit, a second lens unit and a third lens unit that are not illustrated. The first lens unit is held by a first lens holding barrel 21. The above-described lens barrier 20 is provided to the first lens holding barrel 21. An aperture stop 22 controls an amount of light. The second lens unit is held by a second lens holding barrel 23. The second lens holding barrel 23 also holds an image-stabilizing mechanism and a shutter.

A movable cam ring 24 has, in its inner circumferential portion, cam groove portions respectively for moving the first lens holding barrel 21, the aperture stop unit 22 and the second lens holding barrel 23 in a direction in which an optical axis of the lens barrel extends (the direction is hereinafter referred to as "an optical axis direction"). The movable cam ring 24 has, on its outer circumferential portion, a gear portion to which driving force from a drive motor 29 is transmitted. The movable cam ring 24 is held rotatably relative to the first lens holding barrel 21, the aperture stop unit 22, the second lens holding barrel 23, and further to a straight-movable barrel 25 and a stationary (fixed) barrel 27 that will be described later. The movable cam ring 24 receives, at its gear portion, driving force from the drive motor 29 to be rotated thereby.

The straight-movable barrel 25 guides the first lens holding barrel 21, the aperture stop unit 22 and the second lens holding barrel 23 in the optical axis direction and prevents rotation thereof about the optical axis. The third lens holding barrel 26 holds the third lens unit. The stationary barrel 27 houses therein the first lens holding barrel 21, the aperture stop unit 22, the second lens holding barrel 23, the movable cam ring 24 and the third lens holding barrel 26 movably in the optical axis direction. The stationary barrel 27 has, in its inner circumferential portion, three cam groove portions for moving the movable cam ring 24 in the optical axis direction.

An image sensor holding unit 28 holds the image sensor (not illustrated). The stationary barrel 27 is fixed to the image sensor holding unit 28. The image sensor holding unit 28 further holds the above-described drive motor 29. A lens barrel flexible wiring board 28a is fixed to the image sensor holding unit 28. The lens barrel flexible wiring board 28a is connected to an aperture stop flexible wiring board 221 connected to a driver of the aperture stop unit 22 and to a second lens unit flexible wiring board 231 connected to a shutter driver of the second lens holding barrel 23, outside the stationary barrel 27.

The above-described configuration of the lens barrel 2 is merely an example. The lens barrel may be a non-retractable lens barrel in which lens units are moved thereinside to perform the optical zoom operation.

Figure 4:
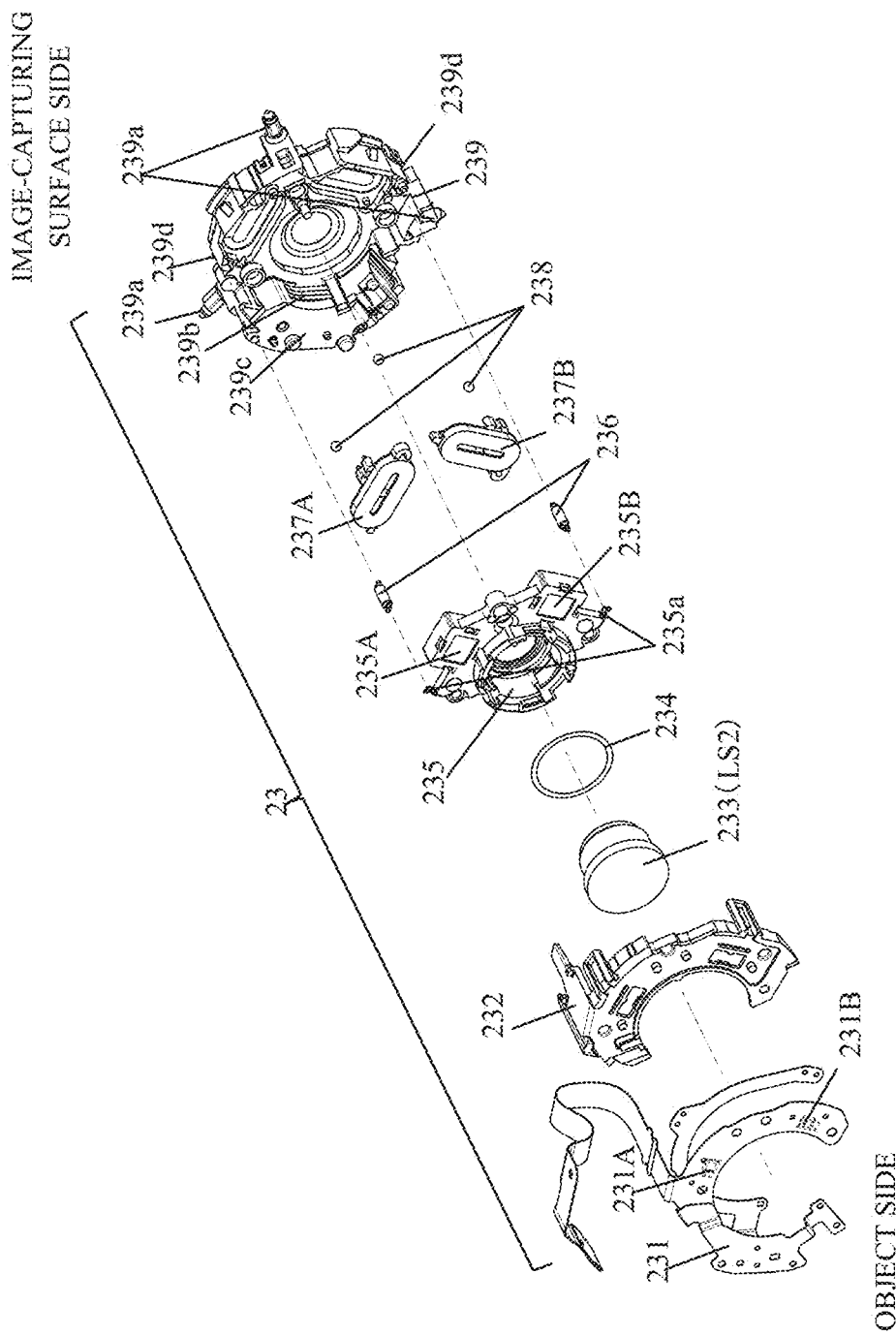
FIG. 4 is an exploded perspective view of a second lens holding barrel in Embodiment 1.
Figure 5:
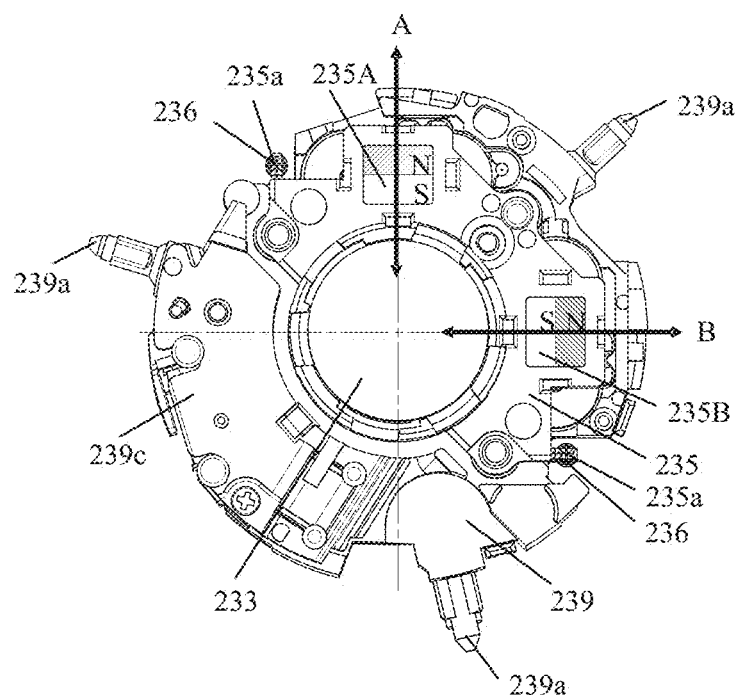
FIG. 5 is a front view of the second lens holding barrel in Embodiment 1.

FIG. 4 is an exploded view of the image-stabilizing lens mechanism provided in the second lens holding barrel 23 illustrated in FIG. 3. FIG. 5 illustrates the image-stabilizing lens mechanism (the second lens unit flexible wiring board 231 and a sensor holder 232 described later are omitted) viewed from an object side in the optical axis direction. A second lens unit base 239 serves a base of the second lens holding barrel 23. The second lens unit base 239 has three follower pins 239a engaging with the three cam groove portions of the movable cam ring 24. In a partial area of the second lens unit base 239 in a direction around the optical axis, a shutter yoke 239b is fixed. A cover member 239c covering the shutter yoke 239b from the object side is fixed to the second lens unit base 239. The shutter yoke 239b and a rotor (not illustrated) constitute a shutter actuator. The shutter actuator is a two-position-switching actuator whose arm provided to the rotor stops at two different positions depending on an energization direction of the shutter actuator.

A second lens unit holder 235 holds a second lens unit 233 (LS2) fixed thereto using adhesive or the like together with a mask member 234 for cutting unwanted light. The second lens unit holder 235 holds magnets 235A and 235B. In the following description, characters A and B added to reference numerals respectively correspond to an A-direction (pitch direction) and a B-direction (yaw direction) illustrated in FIG. 5. A magnet 235A whose N- and S-poles are arranged in the A-direction and a magnet 235B whose N- and S-poles arranged in the B-direction are held by the second lens unit holder 235. At two portions of the second lens unit holder 235, hooks 235a are provided. On these hooks 235a, one ends of tension springs 236 are hooked.

Coil units 237A and 237B each include a coil and a bobbin. The coil units 237A and 237B are fixed using adhesive or the like in concave portions formed in the second lens unit base 239 at positions that face the magnets 235A and 235B in the optical axis direction and are different from positions of the shutter yokes 239b in the second lens unit base 239. The coils provided in the bobbins are energized by connecting the second lens unit flexible wiring board 231 to terminals of the coils. Other ends of the springs 236 whose one ends are hooked on the second lens unit holder 235 are hooked on hooks 239d of the second lens unit base 239. Between the second lens unit base 239 and the second lens unit holder 235, three non-magnetic balls 238 are sandwiched. The springs 236 bias the second lens unit holder 235 toward the second lens unit base 239 in the optical axis direction. Thereby, the second lens unit holder 235 is pressed to the second lens unit base 239 via the balls 238 in the optical axis direction. The second lens unit holder 235 can be smoothly moved (shifted) in a plane orthogonal to the optical axis by rolling the balls 238. Shifting the second lens unit holder 235 depending on camera shakes due to hand jiggling or the like in the above-described plane enables performing image-stabilizing control for reducing image blur on the image sensor. The sensor holder 232 is fixed to the second lens unit base 239 so as to cover the magnets 235A and 235B of the second lens unit holder 235 and therearound from the object side. The sensor holder 232 positions and holds hall elements 231A and 231B described later.

The second lens unit flexible wiring board 231 is connected to the above-described coil units 237A and 237B and to a shutter actuator. On the second lens unit flexible wiring board 231, the hall elements 231A and 231B are mounted. On the second lens unit flexible wiring board 231, the hall elements 231A and 231B are mounted. Detecting changes of magnetic fields from the magnets 235A and 235B shifting with the second lens unit holder 235 through the hall elements 231A and 231B enables detecting a movement amount of the second lens unit holder 235 from its neutral position on the optical axis, that is, a position of the second lens unit holder 235. Thereby, the image-stabilizing control can perform feedback control of the position of the second lens unit holder 235.

Figure 6:
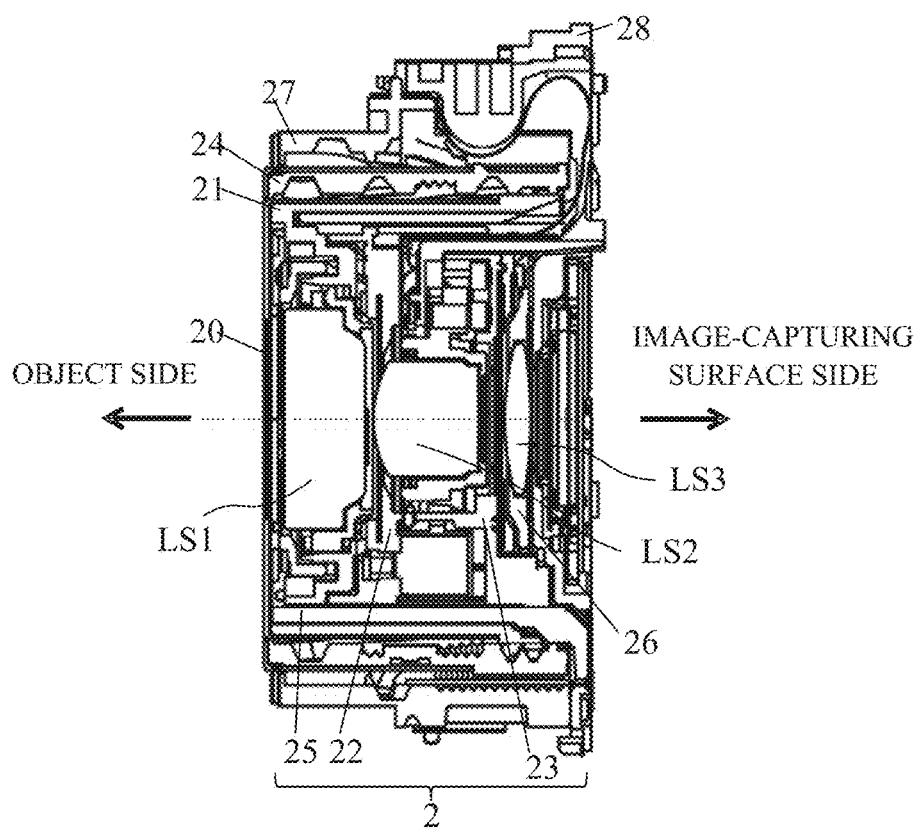
FIG. 6 is a sectional view of the lens barrel at a retracted position in Embodiment 1.

FIG. 6 illustrates a section of the lens barrel 2 in its retracted state (at its retracted position). In the retracted state, the first, second and third lens units LS1, LS2 and LS3 are arranged so as to minimize distances therebetween, and the lens barrier 20 is shut.

Figure 7:
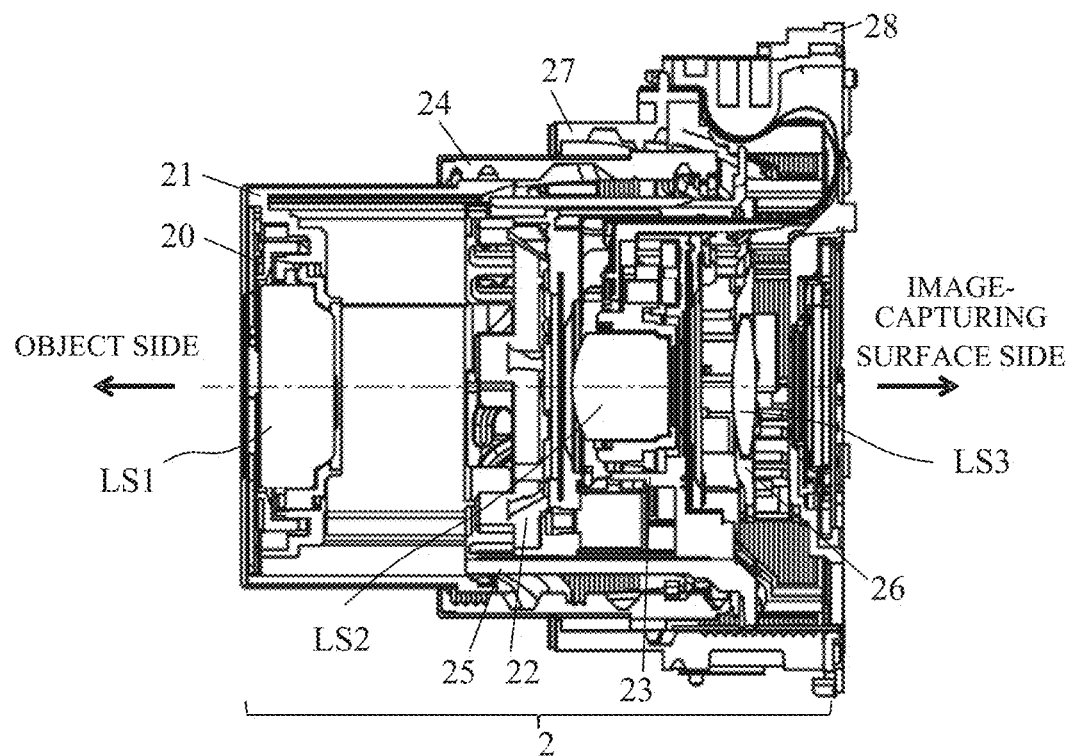
FIG. 7 is a sectional view of the lens barrel at a WIDE position in Embodiment 1.

FIG. 7 is a section of the lens barrel 2 in its wide-angle end state (at a WIDE position). Driving the drive motor 29 from the retracted state moves the first lens holding barrel 21 and the movable cam ring 24 outward such that they protrude from the stationary barrel 27 (camera body 1) and arranges the first, second and third lens units LS1, LS2 and LS3 at positions illustrated in FIG. 7, thereby enabling image capturing at the WIDE position. At the WIDE position, the lens barrel 2 has a maximum field angle, and an image area acquired by one lens barrel 2 is widest in an omnidirectional image described later.

Figure 8:
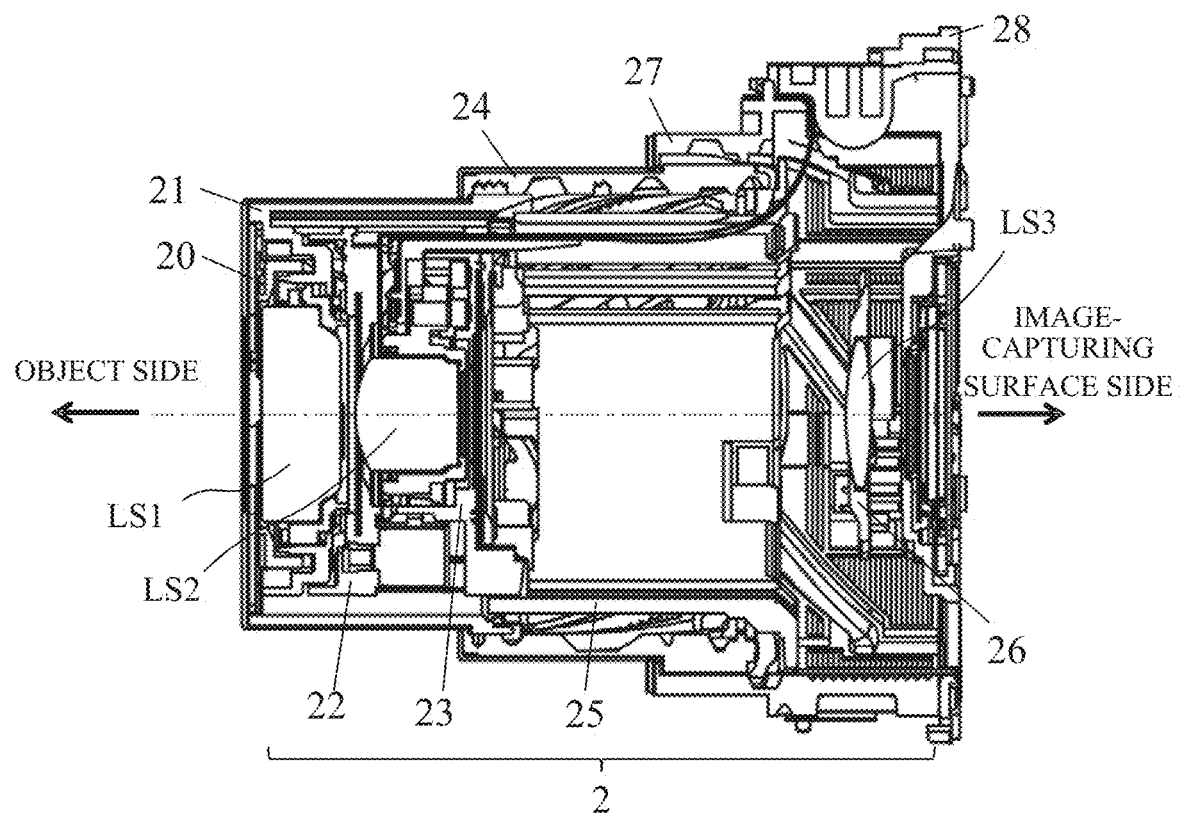
FIG. 8 is a sectional view of the lens barrel at a TELE position in Embodiment 1.

FIG. 8 is a section of the lens barrel 2 in its telephoto end state (at a TELE position). Driving the drive motor 29 from the wide-angle state moves the first lens holding barrel 21 and the movable cam ring 24 relative to the stationary barrel 27 further outward than the wide-angle end state and arranges the first, second and third lens units LS1, LS2 and LS3 at positions illustrated in FIG. 8. At the TELE position, the lens barrel 2 has a minimum field angle, and an image area acquired by one lens barrel 2 is narrowest in the omnidirectional image. Although this embodiment describes the case of using the lens barrels whose magnification-variable optical system includes the three lens units, the number of lens units may be other than three.

When, of the omnidirectional image, an image area including a specific object is required to be enlarged, performing a telephoto side optical zoom operation (that is, an optical zoom operation to a telephoto side) of the lens barrel 2 capturing the specific object enables projecting an enlarged optical image of the specific object onto the image sensor. This makes it possible to provide an enlarged object image whose image quality is not deteriorated by electronic zoom. Each of the eight lens barrels 2 provided in the camera can continuously change its field angle in a range from the wide-angle end state to the telephoto end state.

Figure 9:
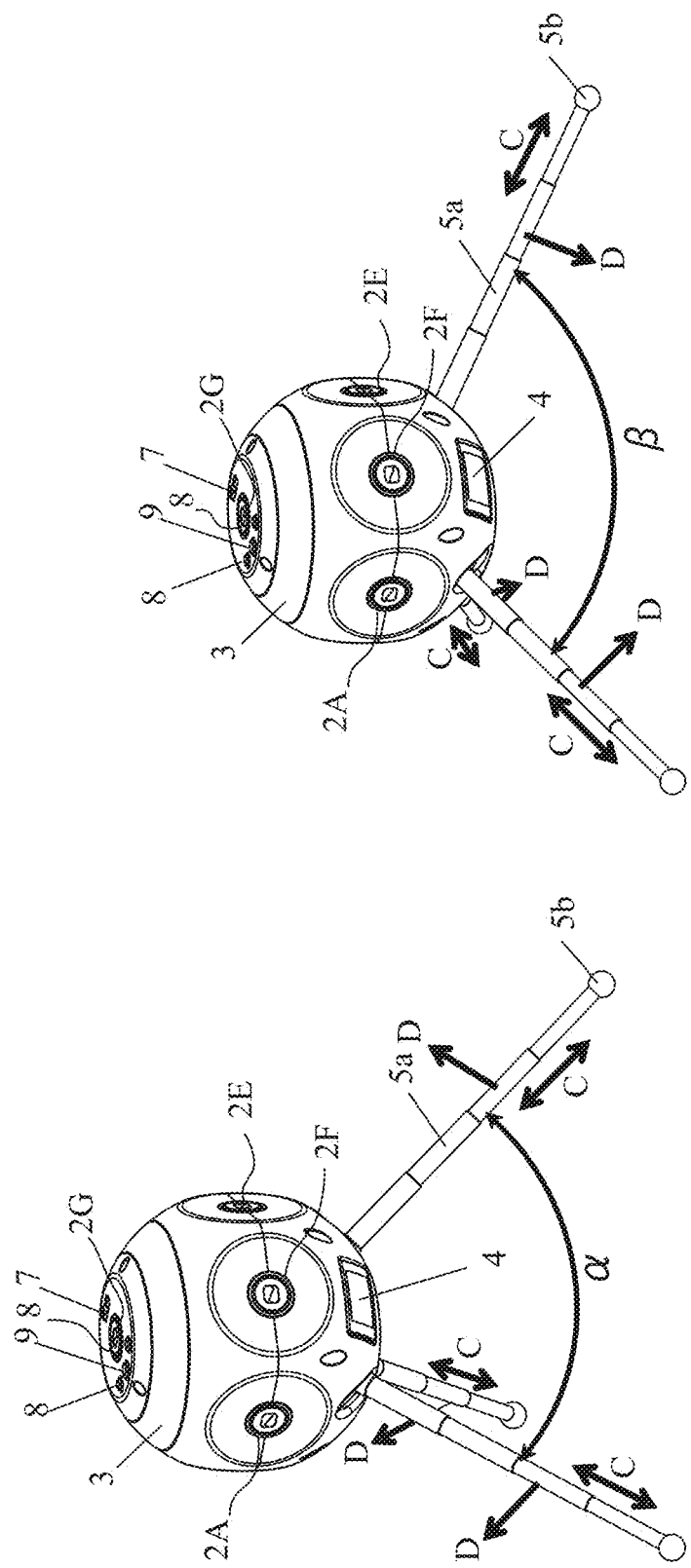
FIG. 9 is a perspective view of a state where a tripod of the camera of Embodiment 1 is extended.

FIG. 9 illustrates a case where, as a preparation of image capturing, a user manually extends the legs 5a of the tripod 5 and sets the camera on the camera setting plane. The three legs 5a of the tripod 5 are extended in a C-direction from the retracted state illustrated in FIG. 1, and three ground contact portions 5b supports the camera body 1. The angles between the three legs 5a can be changed from α to β in a D-direction, and the legs 5a can be extended and contracted, so that their combination enables adjusting the height of the camera body 1.

The camera body 1 includes thereinside a mechanism for equalizing the angles of the three legs 5a relative to the vertical-line direction. The mechanism enables, if the camera setting plane is horizontal, causing the lens barrels 2A to 2F to accurately face to the horizontal directions and causing the lens barrels 2G and 2H to respectively accurately face to an upper side (sky side) and to a lower side (ground side).

Figure 10:
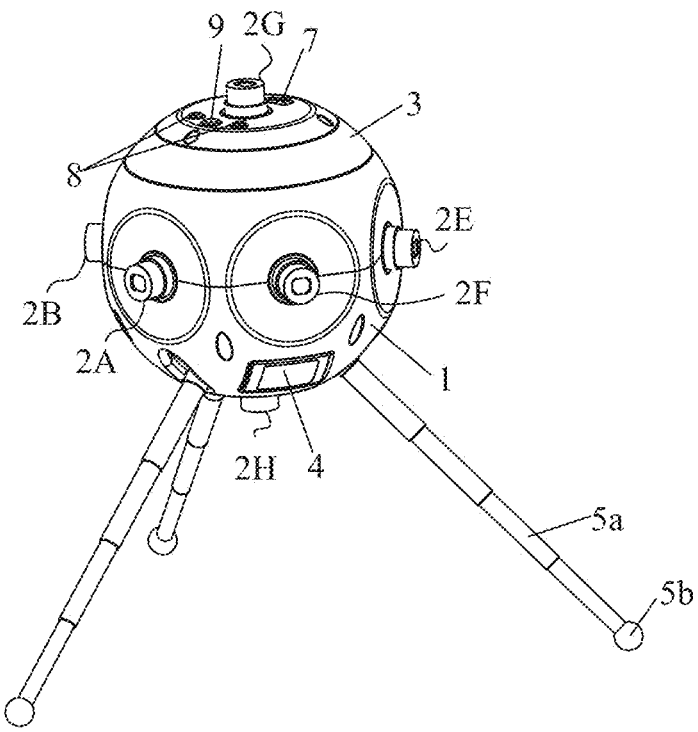
FIG. 10 is a perspective view of an activated state of the camera of Embodiment 1.

FIG. 10 illustrates the power-ON state where the camera is activated in response to a user's ON-operation of the power switch 7 provided in the upper portion of the camera body 1. In the power-ON state, all the lens barrels 2 (2A to 2H) are moved out from the power-OFF state, and the lens barriers 20 are opened, thereby allowing image capturing. In this state, field angles of the eight lens barrels 2 are set such that image capturing of omnidirectional directions including the horizontal 360° directions and sky and ground directions can be performed.

Figure 11:
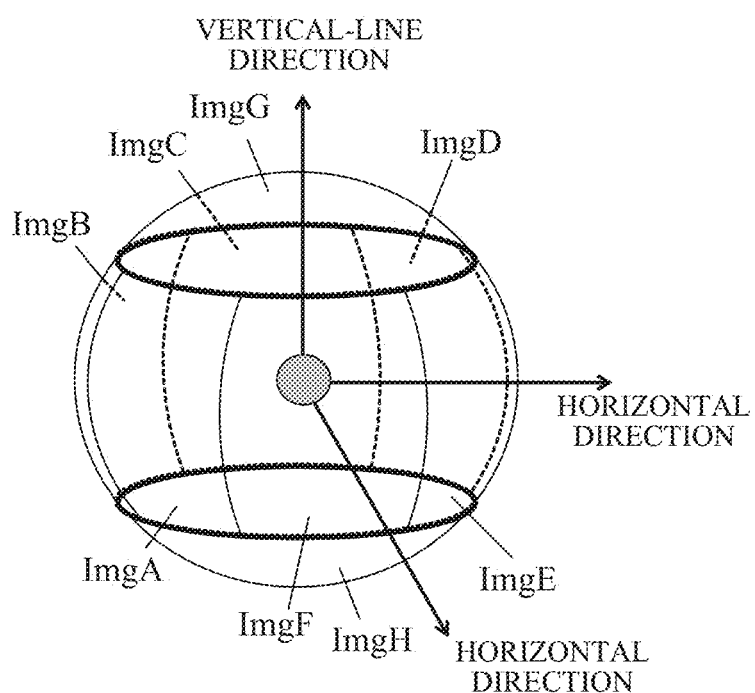
FIG. 11 is a conceptual diagram of a field angle allocation in Embodiment 1.

FIG. 11 illustrates an allocation of image areas (hereinafter referred to as "partial images") for the eight lens barrels 2A to 2H in the omnidirectional image as a captured image acquired by the omnidirectional image capturing. The partial images acquired by the lens barrels 2A to 2F in the horizontal 360° directions are denoted by ImgA to ImgF. The partial images acquired by the sky-side lens barrels 2G and the ground-side lens barrel 2H are denoted by ImgG and ImgH.

Border lines between the partial images are stitched portions in which mutually adjacent partial images are stitched (joined) together in order to produce one continuous omnidirectional image. The camera of this embodiment acquires, through each of the lens barrels 2A to 2H, an image larger than the partial image. Then, the camera detects, from peripheral areas larger than the partial images in two of the acquired eight images, feature points common to the two acquired images, and stitches the two acquired images together such that the feature points overlap each other. Thus, partial images stitched so as to include no object position differences are produced. Performing such a stitching process on all the acquired images produces the omnidirectional image.

Figure 12A:
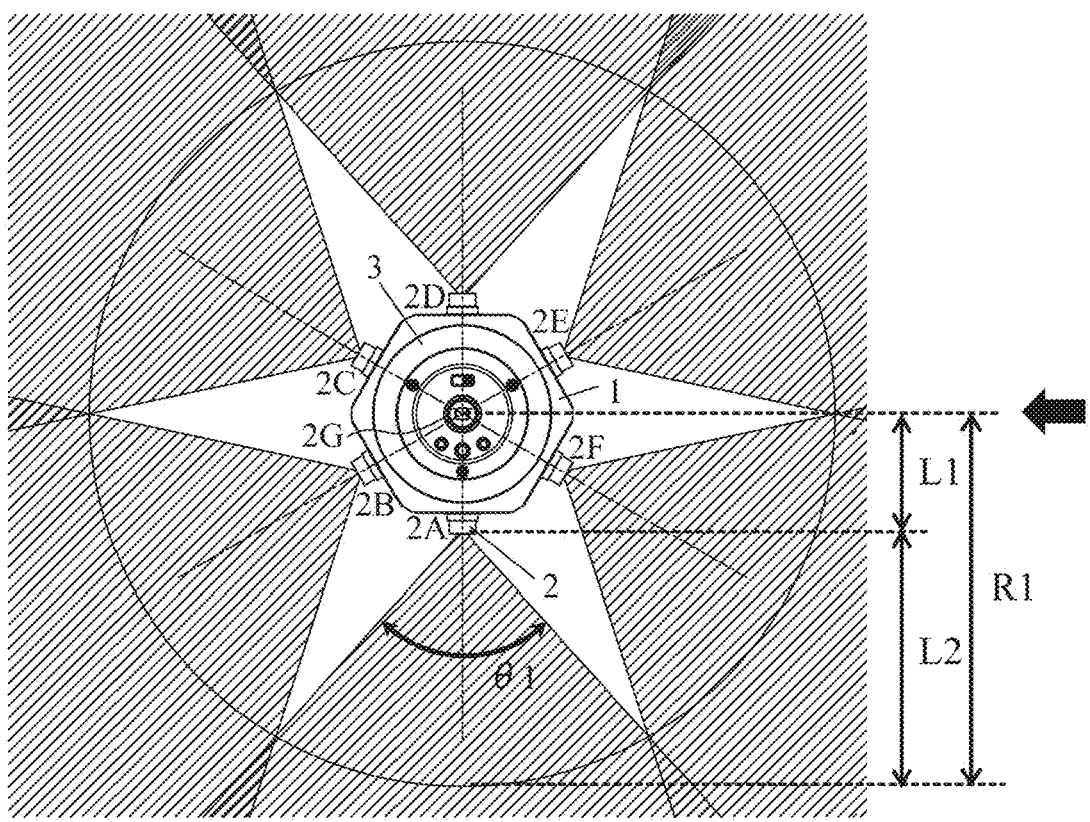
FIGS. 12A and 12B respectively illustrate horizontal and vertical field angles in the activated state in this embodiment.

FIG. 12A illustrates horizontal field angles of the lens barrels 2 (2A to 2F) in the horizontal plane when the camera body 1 is viewed from its upper side. The horizontal field angles of the six lens barrels 2A to 2F arranged at circumferential equal angular intervals are all θ1. The omnidirectional image capturing of a horizontal continuous 360° field angle can be performed in a further outside area than a circle whose radius is R1, the area in which parts of the field angles of the circumferentially mutually adjacent lens barrels 2 overlap one another. R1 corresponds to a distance from a center of the camera body 1 (an optical axis position of the lens barrel 2G) to a position at which the omnidirectional image capturing of the continuous 360° field angle can be performed. L1 represents a distance from the center of the camera body 1 to front ends of the lens barrels 2A to 2F. L2 represents an omnidirectional image-capturing closest distance obtained by subtracting L1 from R1, that is, a closest image-capturing distance at which no discontinuity is generated between the field angles of the lens barrels 2A to 2F.

In this embodiment, description will be made of the field angle of each lens barrel 2, not as a quadrangular pyramid field angle corresponding to short and long sides and diagonal corners of the image sensor, but as a simple conic field angle. Furthermore, in this embodiment, though a moving-out amount of the lens barrel 2 changes depending on its optical zoom position, an amount of the change is sufficiently smaller than the omnidirectional image capturing closest distance L2 and therefore is ignorable, so that regardless of the optical zoom position the distance from the center of the camera body 1 to the front ends of the lens barrels 2A to 2F is defined as L1.

Figure 12B:
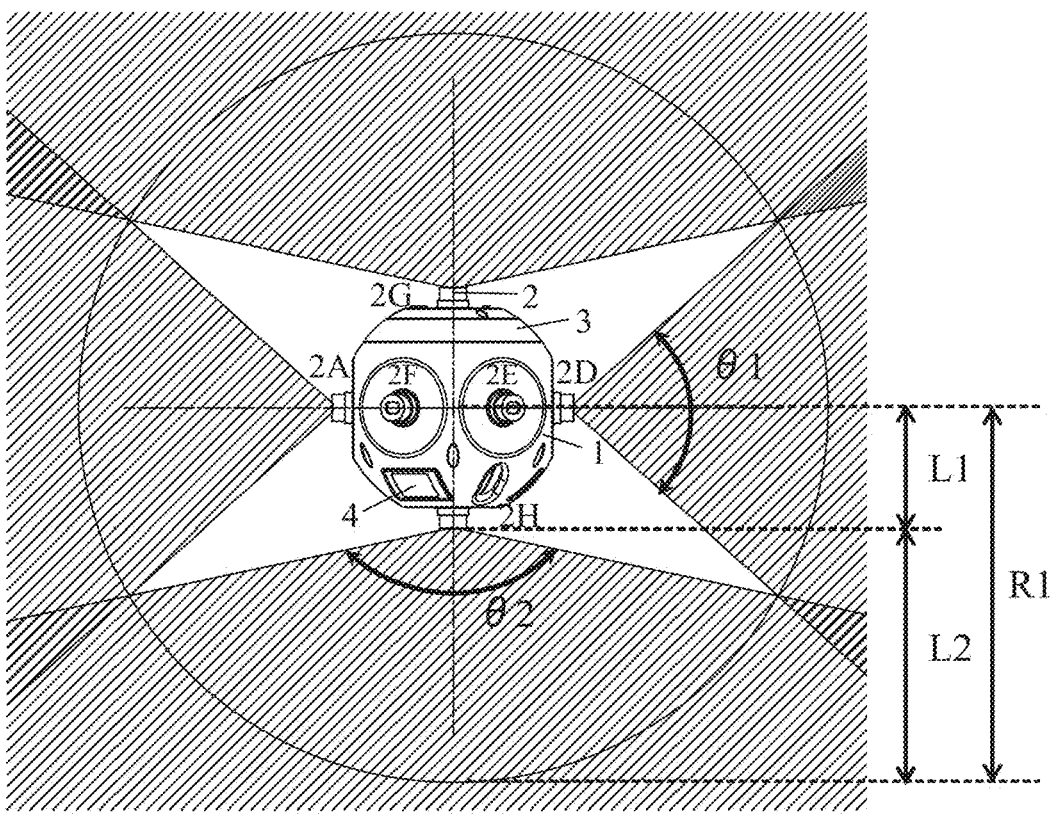

FIG. 12B illustrates vertical field angles of the lens barrels 2A, 2D, 2G and 2H in the vertical plane when the camera body 1 is viewed from the horizontal direction (that is, an arrow direction in FIG. 12A) in the state illustrated in FIG. 12A. The vertical field angles of the lens barrels 2A and 2D are θ1. On the other hand, the vertical field angles of the lens barrels 2G and 2H are θ2 (>θ1). The omnidirectional image capturing of a vertically continuous 360° field angle can be performed in a further outside area than a circle whose radius is R1, the area in which parts of the field angles of the lens barrels 2A, 2D, 2G and 2H overlap one another.

In order to obtain an omnidirectional image-capturing closest distance L2 as with the case of FIG. 12A, it is necessary to set a distance from the center of the camera body 1 to a position at which the omnidirectional image capturing of the continuous 360° field angle can be performed to R1. However, the number of the lens barrels 2G and 2H used for the omnidirectional image capturing in the vertical plane is smaller than that in the horizontal plane, so that the field angles of these lens barrels 2G and 2H are set to θ2 larger than θ1.

Figure 13A:
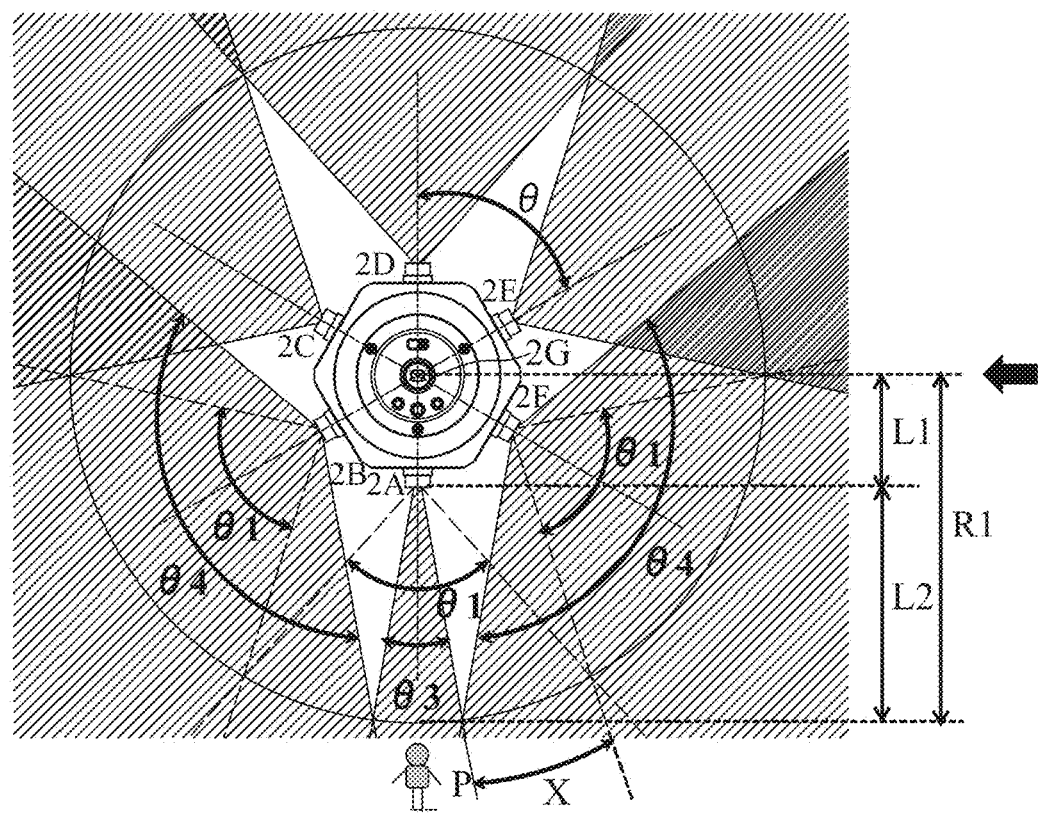
FIGS. 13A and 13B respectively illustrate horizontal and vertical field angles in a telephoto state in this embodiment.

When the camera is activated, the camera sets, for example, the field angles θ1 of the lens barrels 2A to 2F and the field angles θ2 of the lens barrels 2G and 2H such that a minimum omnidirectional image-capturing closest distance L2 is obtained. However, when the camera is activated, the camera may set narrower field angles θ1 and θ2 such that a longer omnidirectional image-capturing closest distance L2 is obtained. FIG. 13A illustrates the camera body 1 in which only the lens barrel (first magnification-variable optical system) 2A performs, from the state illustrated in FIGS. 12A and 12B, a telephoto-side optical zoom (magnification-varying) operation so as to enlarge a specific object P when the camera is viewed from its upper side. The field angle of the lens barrel 2A is narrowed from θ1 illustrated by broken lines to θ3 (<θ1). Therefore, if the field angles of the lens barrels 2B and 2F adjacent on both sides to the lens barrel 2A are maintained at θ1 illustrated by the broken lines, parts of their field angles do not overlap the field angle of the lens barrel 2A, so that the omnidirectional image capturing of the continuous 360° field angle cannot be performed. Thus, the camera of this embodiment controls so as to widen the field angles of the lens barrels 2B and 2F acquiring the partial images joined to the partial image acquired through the lens barrel 2A from θ1 to a wider field angle θ4 (>θ1). That is, the camera causes the lens barrels (second magnification-variable optical systems) 2B and 2F to perform a wide-angle-side optical zoom operation. This enables overlapping the parts of the field angles of the lens barrels 2B and 2F with the narrowed field angle of the lens barrel 2A, and thereby the omnidirectional image capturing of the continuous 360° field angle can be performed. In this control, it is desirable that the field angle θ4 of each of the lens barrels 2B and 2F be calculated and set such that the same omnidirectional image-capturing closest distance L2 (that is, the distance R1) as that before the change of the field angle of the lens barrel 2A be maintained.

On the other hand, the field angles of the other lens barrels 2C to 2E in the horizontal plane are not changed, so that an overlap area of the field angles of the lens barrels 2B and 2C and an overlap area of the field angles of the lens barrels 2E and 2F are increased. Therefore, the omnidirectional image-capturing closest distance near those lens barrels is reduced from L2. In this case, the camera may notify the user that its omnidirectional image-capturing area includes a part where the omnidirectional image-capturing closest distance L2 is shorter than those of other parts, or may enlarge a detection area where the feature points are detected in the stitching process.

Figure 13B:
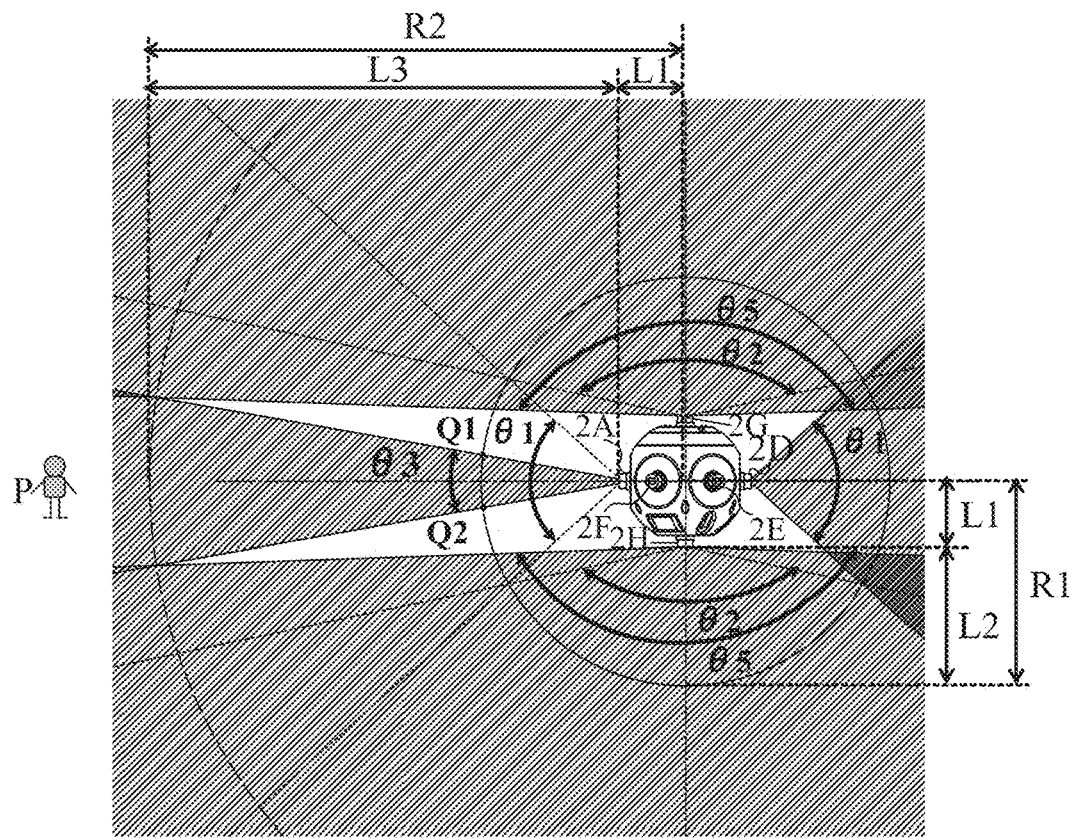

FIG. 13B illustrates field angles of the lens barrels 2A, 2D, 2G and 2H in the vertical plane when the camera body 1 is viewed from the horizontal direction (that is, an arrow direction in FIG. 13A) in the state illustrated in FIG. 13A. As in FIG. 13A, the field angle of the lens barrel 2A is narrowed from θ1 illustrated by dotted lines to θ3 (<θ1). Therefore, if the field angles of the lens barrels 2G and 2H adjacent on both sides in the sky and ground directions to the lens barrel 2A are maintained at θ2 illustrated by dotted lines, parts of their field angles do not overlap the field angle of the lens barrel 2A, so that the omnidirectional image capturing of the continuous 360° field angle cannot be performed.

Thus, the camera of this embodiment controls such that the field angles of the lens barrels 2G and 2H widens from θ2 to a wider field angle θ5 (>θ2). This enables overlapping the parts of the field angles of the lens barrels 2G and 2H with the narrowed field angle of the lens barrel 2A, and thereby the omnidirectional image capturing of the continuous 360° field angle can be performed.

In this control, it is desirable that, as described with reference to FIG. 13A, the field angle 85 of each of the lens barrels 2G and 2H be calculated and set such that the same omnidirectional image-capturing closest distance L2 (that is, the distance R1) as that before the change of the field angle of the lens barrel 2A be maintained. In other words, it is desirable that the field angle θ5 be set so as to pass through Q1 and Q2 in FIG. 13B. However, when it is impossible to set such wide field angles of the lens barrels 2G and 2H even though they are in the wide-angle end state, as illustrated in FIG. 13B, it is necessary to change the omnidirectional image-capturing closest distance from L2 to L3 (that is, to the distance R2) at which the omnidirectional image capturing using the field angle θ5 can be performed. In this case, it is desirable to notify the user that the omnidirectional image capturing cannot be performed at the preset omnidirectional image-capturing closest distance L2 and that the omnidirectional image-capturing closest distance is changed from L2 to L3 (>L2).

As described above, when the numbers of the lens barrels 2 for performing the omnidirectional image capturing in the horizontal plane and in the vertical plane are different from each other, the lens barrels arranged in the horizontal plane and the sky- and ground-side lens barrels may have mutually different focal lengths or zoom magnification ratios.

Furthermore, when the lens barrel has a super-wide-angle image-capturing lens whose field angle is larger than 180°, since light rays may be blocked by the camera body 1, it is desirable to move the lens barrel out to the object side as described in this embodiment.

As described above, when performing the telephoto-side optical zoom operation of, for example, the lens barrel 2A among the eight lens barrels 2, performing the wide-angle-side optical zoom operation of the lens barrels 2B, 2F, 2G and 2H adjacent to the lens barrel 2A enables performing the omnidirectional image capturing of the horizontally and vertically continuous 360° field angles. However, there are conditions between an arrangement angle of the lens barrels and their field angles for enabling performing the omnidirectional image capturing.

In FIG. 13A, an equal arrangement angle between mutually adjacent two of the lens barrels 2A to 2F (that is, an angle between the optical axes of the mutually adjacent two lens barrels 2) in the horizontal plane is denoted by θ. If the field angle θ3 of the lens barrel 2A does not overlap the field angle θ1 of the lens barrel 2F at all even at an infinite distance, the omnidirectional image capturing of the continuous 360° field angle cannot be performed.

The reason for no overlap of these field angles θ3 and θ1 is that an angle X between a line of an end of a half field angle θ3/2 of the lens barrel 2A and a line of an end of a half field angle θ1/2 of the lens barrel 2F is more than 0 such that these lines are spread than mutually parallel lines. Therefore, a smaller angle X than 0 is a condition for overlap of parts of the field angles of the mutually adjacent lens barrels. The angle X is obtained by subtracting, from the above-described arrangement angle θ, a sum of the half field angle θ3/2 of the lens barrel 2A and the half field angle θ1/2 of the lens barrel 2F. That is, the following relations are established.

$$X=\theta-(\theta 3/2+\theta 1/2)<0$$

$$\theta<\theta 3/2+\theta 1/2 \quad (1)$$

In above expression (1), θ3 corresponds to a field angle $\theta_1$ of the first magnification-variable optical system, and θ1 corresponds to a field angle $\theta_2$ of the second magnification-variable optical system.

As described above, the camera of this embodiment compensates for the narrowed field angle of the lens barrel performing the telephoto-side optical zoom operation with the widened field angle of the lens barrel adjacent thereto performing the wide-angle-side optical zoom operation. This compensation requires satisfying the condition that the sum of the half field angles of these mutually adjacent lens barrels is larger than at least the arrangement angle of these lens barrels. The condition of expression (1) is a condition for performing the continuous omnidirectional image capturing at the infinite distance. Therefore, when the omnidirectional image-capturing closest distance is set shorter than the infinite distance as described above, it is necessary to increase the sum of the half field angles so as to increase an overlap amount of the field angles of the lens barrels. Furthermore, at any omnidirectional image-capturing closest distance, the stitching process on the partial images acquired through the mutually separate lens barrels is required, so that it is desirable to perform image capturing at a further widened field angle for obtaining a wider stitching area in the acquired image.

Figure 14:
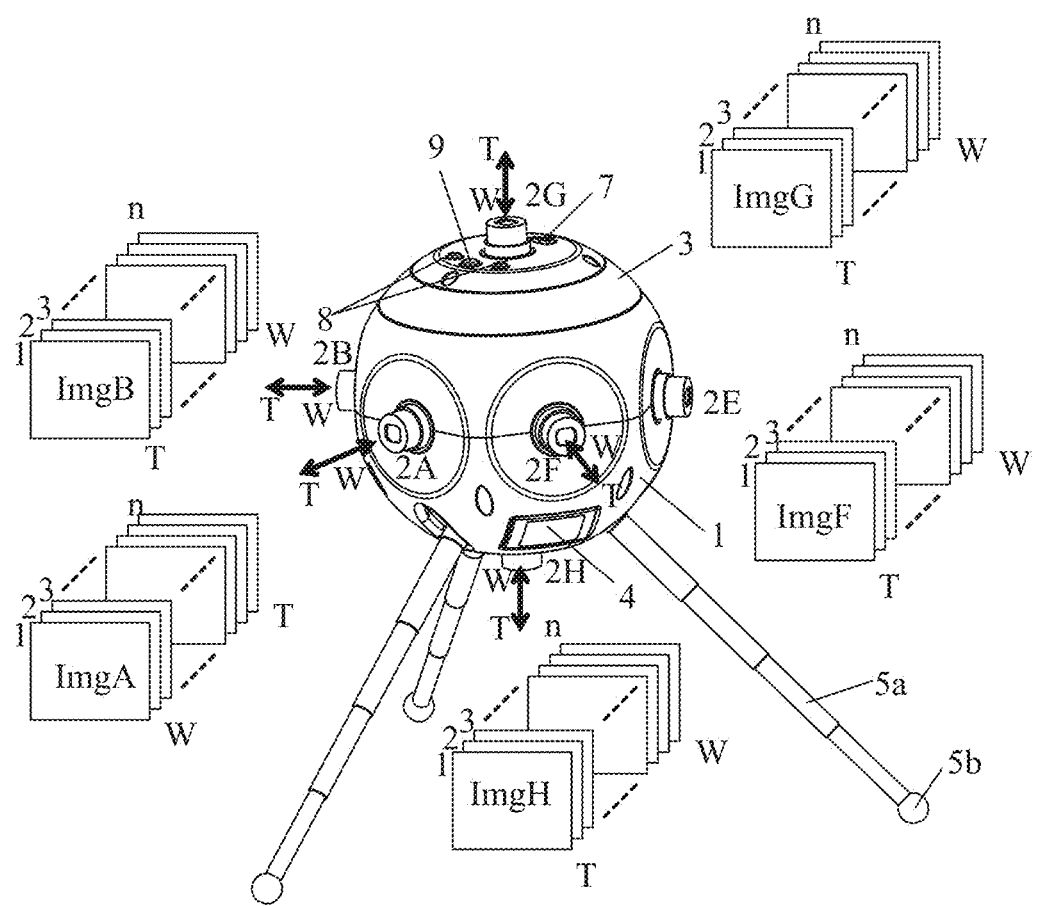
FIG. 14 is a conceptual diagram of image capturing during optical zoom in Embodiment 1.

In this embodiment, using the optical zoom operation of any of the lens barrels 2 enables simultaneously acquiring the omnidirectional image and the enlarged image of the specific object. The omnidirectional image is acquired as a continuous image through the multiple lens barrels 2 mutually compensating for their field angles, so that even though positions of the stitching portions are changed, the omnidirectional image is displayed on a monitor without change. However, due to the telephoto-side optical zoom operation of a certain lens barrel, an enlarged image of a specific object is suddenly displayed in the omnidirectional image, which provides a feeling of strangeness to a viewer of the omnidirectional image. Thus, as illustrated in FIG. 14, the camera of this embodiment continuously acquires partial images during the variation of magnification (optical zoom operations) of the lens barrels 2.

The following description will be made of the case where, as described with reference to FIGS. 13A and 13B, the lens barrel 2A performs the telephoto-side optical zoom operation and the lens barrels 2B, 2F, 2G and 2H perform the wide-angle-side optical zoom operations. In FIG. 14, W written near the respective lens barrels 2 denotes the wide-angle side, and T denotes the telephoto side.

When the telephoto-side optical zoom operation of the lens barrel 2A is performed from the power-ON (activated) state of the camera, simultaneously therewith the wide-angle-side optical zoom operations of the lens barrels 2B, 2F, 2G and 2H are performed so as to satisfy the above-described omnidirectional image-capturing closest distance. From this start time of the optical zoom operations, the omnidirectional image capturing through the lens barrels 2 is started. Then, multiple partial images ImgA(1 to n) through the lens barrel 2A during its telephoto-side optical zoom operation from the wide-angle side are sequentially acquired.

On the other hand, multiple partial images ImgB(1 to n), ImgF(1 to n), ImgG(1 to n) and ImgH(1 to n) through the lens barrels 2B, 2F, 2G and 2H during their wide-angle-side optical zoom operations from the telephoto side are sequentially acquired. Then, the camera stitches (joins) first partial images acquired through the lens barrels 2A, 2B, 2F, 2G and 2H performing the optical zoom operations to the partial images acquired through the lens barrels 2C to 2E not performing the optical zoom operations to produce a first omnidirectional image.

The reason for the lens barrels 2C to 2E to perform no optical zoom operations is that the lens barrels 2B, 2F, 2G and 2H perform the wide-angle-side optical zoom operations, that is, the optical zoom operations in a direction in which the overlap areas with the field angles of the lens barrels 2C to 2E increase.

Similarly, until the optical zoom operation of the lens barrel 2A is ended, the camera acquires n partial images through each of the lens barrels 2A, 2B, 2F, 2G and 2H to produce n omnidirectional images.

The camera sequentially displays the n omnidirectional images thus acquired on the monitor, which enables displaying a high-quality enlarged image of the specific object so as to smoothly enlarge the enlarged image (that is, so as not to provide the feeling of strangeness to the viewer). Furthermore, enlarged images of other objects existing around the specific object gradually change, so that an omnidirectional image providing little feeling of strangeness.

Although this embodiment described the example in which only one lens barrel performs the telephoto-side optical zoom operation, there is a case where no specific object is set in acquiring the omnidirectional image. Next, description will be made of a case where all the lens barrels perform the telephoto-side optical zoom operations from the wide-angle side. This embodiment in this case enables acquiring eight enlarged images through the eight lens barrels 2A to 2H. In this case, the camera may cause the eight lens barrels 2A to 2H to one by one perform the telephoto-side optical zoom operations from the wide-angle side to acquire the eight enlarged images corresponding to the eight lens barrels 2A to 2H. However, the camera performs the telephoto-side optical zoom operations of the lens barrels 2A, 2C and 2E in the horizontal plane, and simultaneously therewith performs the wide-angle-side optical zoom operations of the other lens barrels 2B, 2D, 2F, 2G and 2H. Thereby, the camera can acquire enlarged images through the lens barrels 2A, 2C and 2E at once.

Furthermore, the camera performs the telephoto-side optical zoom operations of the lens barrels 2B, 2D and 2F, and simultaneously therewith performs the wide-angle-side optical zoom operations of the lens barrels 2A, 2C, 2E, 2G and 2H. Thereby, the camera can acquire enlarged images through the lens barrels 2B, 2D and 2F at once. Moreover, the camera performs the telephoto-side optical zoom operations of the lens barrels 2G and 2H, and simultaneously therewith performs the wide-angle-side optical zoom operations of the lens barrels 2A to 2F. Thereby, the camera can acquire enlarged images through the lens barrels 2G and 2H at once.

Performing such simultaneous optical zoom operations of the multiple lens barrels 2 enables acquiring the enlarged images through all the lens barrels with a smaller number of times of image capturing and in a shorter time, and enables reducing an amount of image data, compared with a case of performing one by one the optical zoom operations of the lens barrels.

Figure 15:
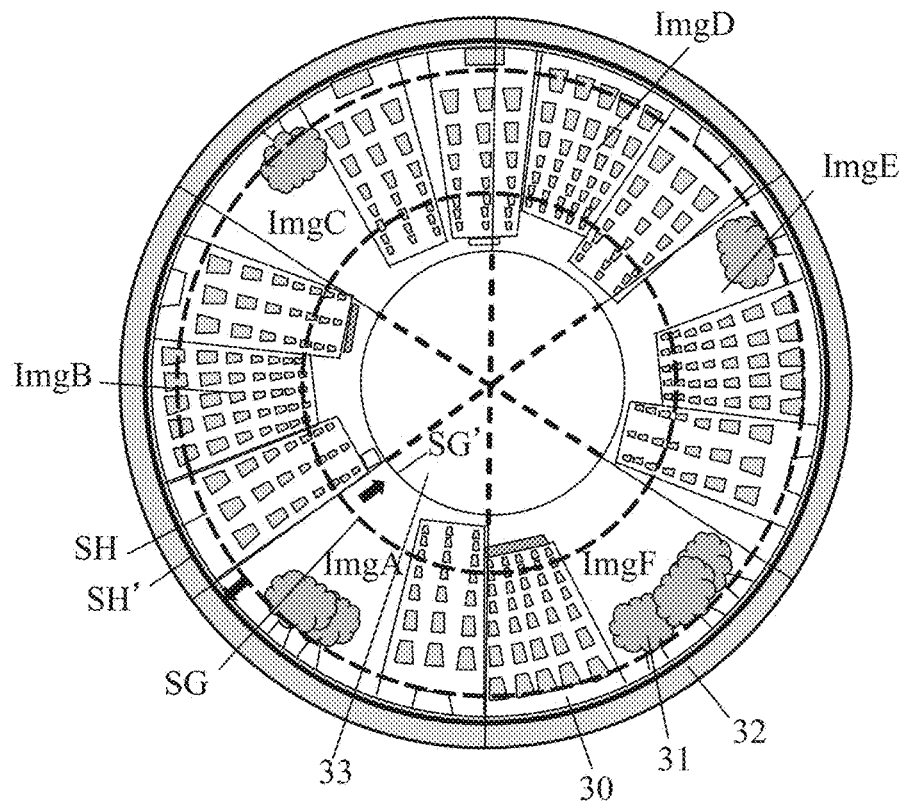
FIG. 15 illustrates an omnidirectional image acquired by the camera in a wide-angle state in Embodiment 1.

FIG. 15 illustrates an image of landscape of skyscrapers as an example of the omnidirectional image acquired by the omnidirectional image capturing performed by the camera illustrated in FIG. 10. This image includes skyscrapers 30, trees 31, the ground 32 and the sky 33. A broken line SG denotes stitched portions of a partial image (image inside the broken line SG) acquired through the sky-side lens barrel 2G and partial images (images outside the broken line SG) acquired through the lens barrels 2A to 2F in the horizontal plane. A broken line SH denotes stitched portions of a partial image (image outside the broken line SH) acquired through the ground-side lens barrel 2H and partial images (images inside the broken line SH) acquired through the lens barrels 2A to 2F in the horizontal plane. In such an omnidirectional image, the stitched portions SG and SH overlap objects such as the skyscrapers 30 and trees 31. Widows of the skyscrapers 30 are objects having mutually equal shapes and being continuously repeated, so that the camera may erroneously detect feature points. This results in distortion or discontinuity of the stitched portion, and thereby an unnatural omnidirectional image is produced. Thus, the camera body 1 in this embodiment has a function as a contrast detector that detects a contrast of each partial image, and the camera of this embodiment determines a high contrast area (first area) including the skyscrapers 30 whose contrast is high and a low contrast area (second area) including the ground 32, the sky 33 and others whose contrasts are low. Furthermore, the camera performs the optical zoom operations of the lens barrels 2G and 2H to produce partial images in which the stitched portions SG and SH are included in the low contrast area. Simultaneously, the camera performs the optical zoom operations of the other lens barrels 2A to 2F to compensate for changes of the field angles of the lens barrels 2G and 2H. Specifically, the camera performs the telephoto-side optical zoom operations of the lens barrels (first magnification-variable optical systems) 2G and 2H and performs the wide-angle-side optical zoom operations of the lens barrels (second magnification-variable optical systems) 2A to 2F. This moves the stitched portions (joined portions) SG and SH denoted by the broken lines to stitched portions SG' and SH' denoted by solid lines. Such an optical zoom process enables reducing a possibility that the unnatural omnidirectional image including the distortion or discontinuity of the stitched portion is produced.

The partial images in which the stitched portion is included in the low contrast area may be newly acquired after the determination of the contrast, and such partial images may be extracted from the multiple partial images acquired during the optical zoom operations.

Figure 16:
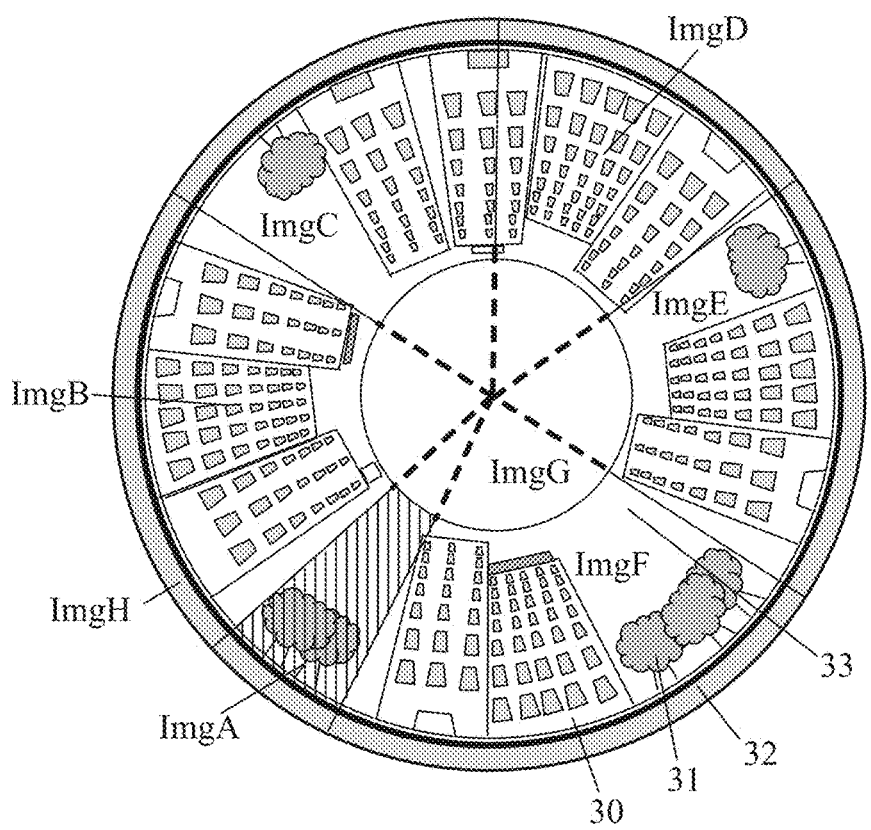
FIG. 16 illustrates an omnidirectional image acquired by the camera in a telephoto state in Embodiment 1.

FIG. 16 illustrates an omnidirectional image acquirable when, as illustrated in FIGS. 13A and 13B, the camera performs the telephoto-side optical zoom operation of the lens barrel 2A and the wide-angle-side optical zoom operations of the lens barrels 2B, 2F, 2G and 2H. Magnification-variable optical systems include ones each whose brightness (F-number) changes in response to its variation of magnification. Specifically, the brightness becomes dark (the F-number increases) with telephoto-side variation of magnification. Description will below be made of brightness correction when such a lens barrel whose brightness changes in response to its variation of magnification is used. In FIG. 16, a partial image ImgA is acquired through the lens barrel 2A in a further telephoto-side magnification state (further telephoto-side zoom magnification ratio) than those of the lens barrels 2C to 2E. Partial images ImgB, ImgF, ImgG and ImgH are acquired respectively through the lens barrels 2B, 2F, 2G and 2H in further wide-angle-side magnification states than those of the lens barrels 2C to 2E. The partial image ImgA is darker than partial images ImgC to ImgE acquired through the lens barrels 2C to 2E, and the partial images ImgB, ImgF, ImgG and ImgH are brighter than the partial images ImgC to ImgE.

The field angles of the lens barrels 2 are originally mutually different due to the numbers thereof in the horizontal plane and in the vertical plane, and the F-numbers of the respective lens barrels 2 are also mutually different due to differences of the magnification ratios thereof, so that the partial images respectively acquired through the lens barrels 2 have differences in brightness. Therefore, the stitched portions in the omnidirectional image have brightness differences. Thus, the camera body 1 in this embodiment has a function as a brightness corrector. This brightness correction function converts a difference between predetermined F-numbers corresponding to the magnification ratios into a brightness step number, and performs brightness correction (brightness control) on the partial image using the step number. The brightness correction may be performed so as to match the brightness to those of, among the eight lens barrels 2, ones whose optical conditions including the F-numbers are mutually identical and whose number is greatest, or may be performed as predetermined by a user. Most omnidirectional images include in somewhere a high intensity object such as the sun or an illumination, and therefore have uneven brightness, so that it is necessary to perform, on such omnidirectional images, brightness correction depending on image-capturing environment. Performing in the camera body 1 the above-described brightness correction for correcting the difference in F-number corresponding to the difference in zoom magnification ratio before the brightness correction depending on the image-capturing environment enables finally providing a natural omnidirectional image in which the stitched portions have little difference in brightness.

Figure 17:
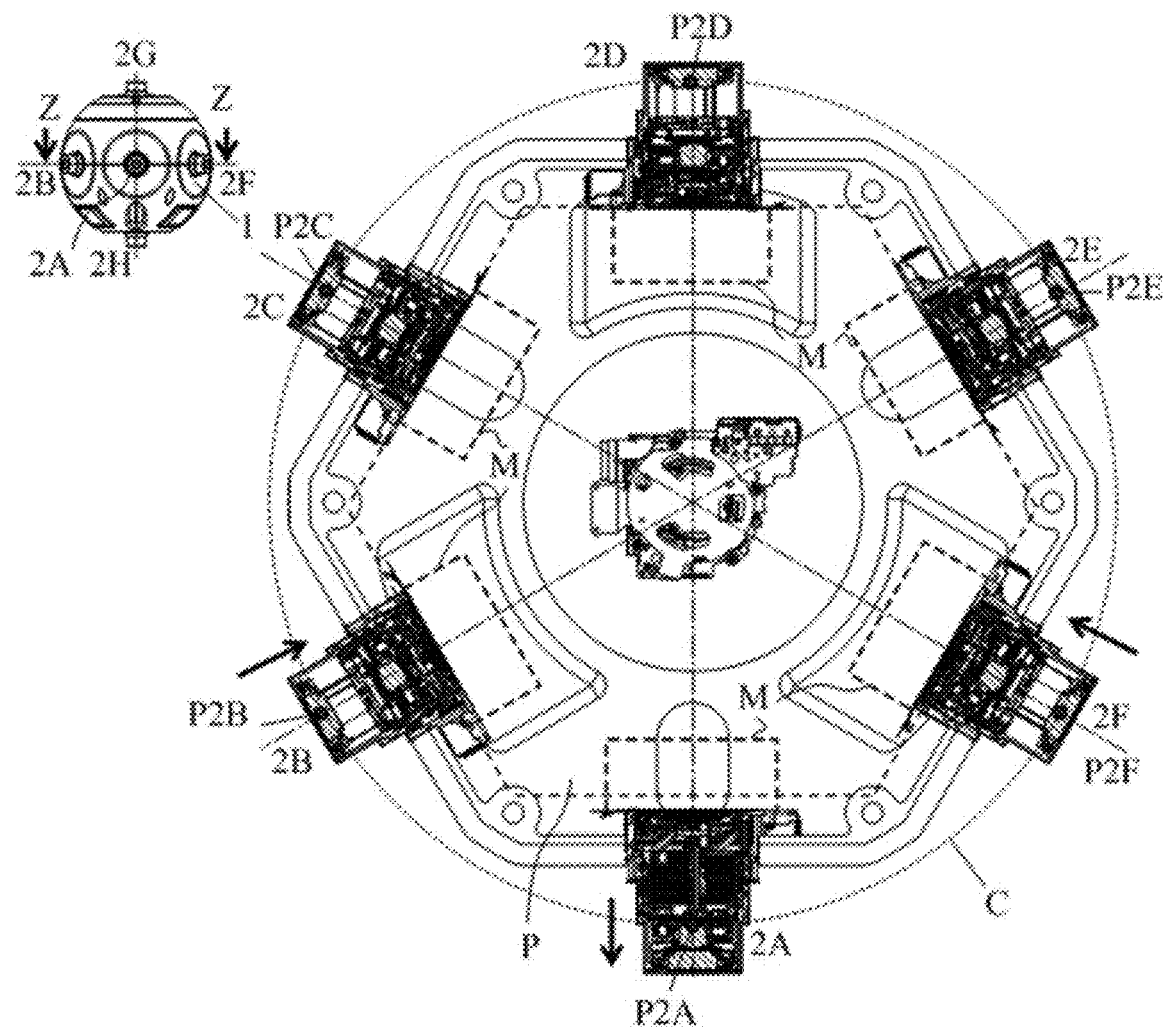
FIG. 17 is a vertical sectional view of the camera in the telephoto state of Embodiment 1.

FIG. 17 illustrates a section of the camera body 1 cut along a plane Z and corresponding to when, as illustrated in FIG. 13A, the lens barrel 2A performs the further telephoto-side optical zoom operation than the lens barrels 2C to 2E and the lens barrels 2B and 2F perform the further wide-angle-side optical zoom operations than the lens barrels 2C to 2E. In FIG. 17, the spherical external member of the camera body 1 is omitted.

Typically, an entrance pupil position (hereinafter referred to as "a nodal point") of a magnification-variable optical system is located at a vicinity of a most-object side lens unit (a first lens unit LS1 in this embodiment), and moves to an image-capturing surface side with a telephoto-side optical zoom operation of the magnification-variable optical system narrowing its field angle. When a panorama image or an omnidirectional image is produced by joining together multiple partial images acquired through multiple lens barrels, it is desirable to arrange the multiple lens barrels such that their nodal points are located as mutually close as possible to reduce parallaxes between the partial images. This makes it possible to smoothly join the partial images together. This embodiment cannot arrange the lens barrels 2A to 2F such that their nodal points are located at an identical position. However, as an alternative method, this embodiment arranges the lens barrels 2A to 2F such that their nodal points P2A to P2F are located on an identical circle. The camera body 1 includes thereinside moving mechanisms M that move the respective lens barrels 2 (2A to 2F) in their optical axis directions each using a drive actuator (not illustrated) separate from the drive motor 29. The camera detects positions of the lens barrels 2 in the optical axis direction using position sensors (not illustrated), detects the zoom magnification ratios (zoom positions) thereof, and controls the moving mechanisms M such that the nodal points are located on a predetermined identical circle C regardless of changes of the zoom positions. The positions of the nodal point are optically defined depending on the zoom positions, so that it is desirable to store the positions of the nodal point corresponding to the respective zoom positions as difference amounts from a predetermined reference position (for example, a position in the wide-angle state) to a memory (not illustrated). Thereby, the camera can move the lens barrel 2 by the moving mechanism M so as to cancel out the difference amount corresponding to the detected zoom position. In FIG. 17, the camera moves, with reference to positions P of the lens barrels 2C to 2E, the entire lens barrel 2A performing the telephoto-side optical zoom operation to the object side by its moving mechanism M, and moves the entire lens barrels 2B and 2F performing the wide-angle-side optical zoom operations to the image-capturing surface side by their moving mechanisms M. This enables, even though the lens barrels 2A to 2F are set to mutually different zoom positions, disposing the nodal points P2A to P2F of the lens barrels 2A to 2F on the identical circle C, and thereby enables making the parallaxes between the partial images acquired through the lens barrels 2A to 2F approximately identical to one another. Therefore, the camera can produce an omnidirectional image in which the multiple partial images are joined together without unnaturalness.

The identical circle C on which the nodal points P2A to P2F of the lens barrels 2A to 2F should be located means a circle having a certain width in its diameter direction. The certain width corresponds to an allowable range for differences of the nodal points, where the differences generate parallaxes of the partial images acquired through the lens barrels 2A to 2F, the parallaxes being no problem in joining these partial images.

Although FIG. 17 described the case of controlling the moving mechanisms M such that the nodal points of the lens barrels 2A to 2F arranged in the horizontal plane, similar control can apply to the moving mechanisms M for the lens barrels 2G, 2H, 2A and 2D arranged in the vertical plane illustrated in FIG. 13B. A configuration may be employed in which multiple lens barrels are arranged such that their optical paths mutually intersect, and the lens barrels are moved such that movements of their nodal points due to changes of their zoom positions are canceled out.

Figure 20:
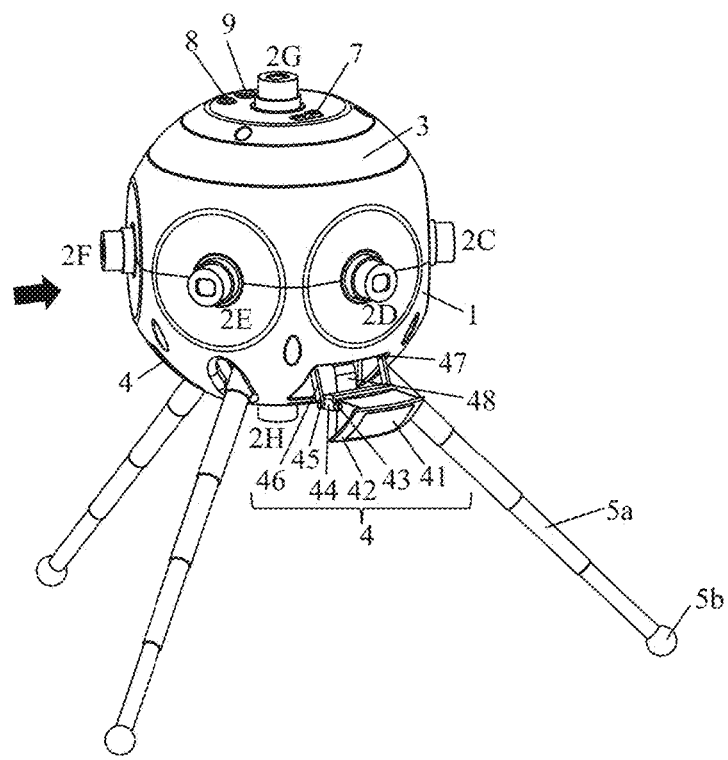
FIG. 20 is a perspective view of the camera from which illumination units are protrude in the camera of Embodiment 1.

FIG. 20 illustrates a state where the movable illumination units 4 are protruded from the camera body 1.

The three movable illumination units 4 are provided in the lower portion of the camera body 1 between the lens barrel 2H and the lens barrels 2A to 2F and between the three legs 5a of the tripod 5 (lower than the lens barrels 2B, 2D and 2F). Illumination positions (protruded positions) of the respective movable illumination units 4 are adjustable. Each of the movable illumination units 4 includes a light emitter such as an LED or a Xenon tube, a window member 41 through which an illumination light is transmitted and a holder 42 holding the light emitter and the window member 41. Each of the movable illumination units 4 further includes a first arm 44 holding the holder 42 rotatably about an axis 43 and a second arm 46 supporting the first arm 44 rotatably about an axis 45.

The second arm 46 is supported rotatably about an axis 47 provided to the camera body 1. Therefore, the holder 42 is rotatable about the axes 43, 45 and 47 to be movable so as to protrude or change its direction relative to the camera body 1, and thereby its protrusion amount and illumination direction are changeable in response to a user's request. The light emitter in the holder 42 and a circuit board (not illustrated) in the camera body 1 are connected to each other through a flexible wiring board 48.

In this embodiment, the window member 41 is exposed in the retracted state illustrated in FIG. 1. However, the window member 41 may be completely retracted into the camera body 1 in the retracted state. Although in this embodiment the three movable illumination units 4 are individually protrudable and retractable relative to the camera body 1, these movable illumination units 4 may be protrudable and retractable relative to the camera body 1 in interlock with one another by a link mechanism. In omnidirectional image capturing the sun or a light source such as an illumination mostly exists above the camera, and therefore an area below the camera body 1 is likely to be in shadow, so that use of the movable illumination units 4 enables achieving a proper exposure in the image capturing through the lens barrel 2H.

Figure 21:
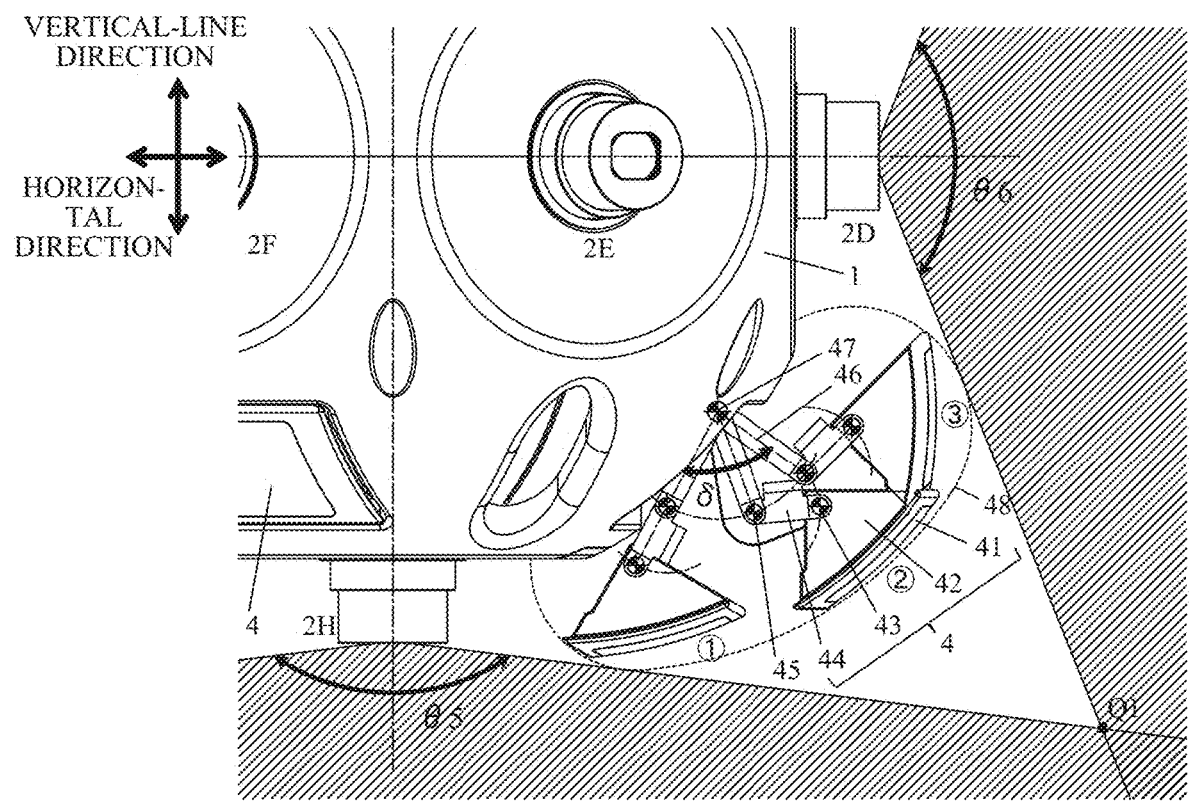
FIG. 21 illustrates a movable area of the illumination unit and the field angle of the lens barrel in the camera of Embodiment 1.

FIG. 21 illustrates the camera body 1 viewed from an arrow direction in FIG. 20, and illustrates a movable area of one of the three movable illumination units 4 provided between the lens barrels 2D and 2H. The tripod 5 is omitted. The second arm 46 of the movable illumination unit 4 is rotated about the axis 47 by an angle δ when moving the movable illumination unit 4 to a position farthest away from the camera body 1. Furthermore, the first arm 44 is extended from a tip of the second arm 46, and the holder 42 is rotatably connected to a tip of the first arm 44. Therefore, a movement locus of a tip of the movable illumination unit 4, that is, an outer edge of the movable area of the movable illumination unit 4 when the movable illumination unit 4 is moved to the position farthest away from the camera body 1 is approximately indicated by a dotted line 48. The movable illumination unit 4 is movable inside the movable area indicated by the dotted line 48.

The movable illumination unit 4 illuminates, from a first position (indicated by a circled 1) in FIG. 21, an area immediately below the camera body 1, and illuminates, from a second position (indicated by a circled 2), an area obliquely below the camera body 1. Furthermore, the movable illumination unit 4 illuminates, from a third position (indicated by a circled 3), toward a horizontal direction from the camera body 1. This movable illumination unit 4 protruding from the camera body 1 may be included in the field angles of the lens barrels 2C, 2D, 2E and 2H (that is, the partial images acquired therethrough). Description will herein be made of a relation between the field angles of the lens barrels 2D and 2H and the position of the movable illumination unit 4.

Although the movable illumination unit 4 is close to the lens barrel 2H at the first position, the movable illumination unit 4 is not included in a smaller field angle of the lens barrel 2H than θ5. Similarly, although the movable illumination unit 4 is close to the lens barrel 2D at the third position, the movable illumination unit 4 is not included in a smaller field angle of the lens barrel 2D than θ6. That is, setting the field angles of the lens barrels 2H and 2D respectively smaller than θ5 and θ6 enables avoiding inclusion of the movable illumination unit 4 located at any position into the movable area (indicated by the dotted line 48) of the holder 42. Therefore, it is possible to acquire, through the lens barrels 2H and 2D, continuous partial images at any distance farther than a position Q1 at which the field angles of the lens barrels 2H and 2D partially overlap each other.

Information indicating that the movable illumination unit 4 is protruded from the camera body 1 can be acquired through non-detection by a switch that detects the retraction of the holder 42 of the movable illumination unit 4 into the camera body 1 or through detection by a magnetic detector such as a hall element and a GMR (Giant Magnetoresistance) sensor that detects changes of a magnetic field. These switch and magnetic detector each correspond to a protrusion detector. When the information indicating that the movable illumination unit 4 is protruded from the camera body 1 is acquired, the field angles of the lens barrels 2D and 2H are restricted regardless of the position of the movable illumination unit 4 in its movable area. That is, when image capturing is performed through the lens barrels 2D and 2H with their field angles respectively wider than θ5 and θ6, in response to detecting the protrusion of the movable illumination unit 4, the camera performs control for causing the lens barrels 2D and 2H to perform telephoto-side optical zoom operations so as to set their field angles respectively narrower than θ5 and θ6.

Such control is referred to as "a field angle setting control".

Further narrowing the field angles of the lens barrels 2D and 2H that have been narrowed by the field angle setting control enables more positively avoiding the inclusion of the movable illumination unit 4 into these field angles. However, normally in order to shorten the omnidirectional image-capturing closest distance (L2), it is desirable to perform the field angle setting control on the field angles of the lens barrels 2D and 2H such that the movable illumination unit 4 is located near an outer edge of the field angles thereof. Performing thus the field angle setting control such that the movable illumination unit 4 protruded from the camera body 1 is not included in the field angles of the multiple lens barrels 2 enables further shortening the omnidirectional image-capturing closest distance while avoiding the inclusion of the movable illumination unit 4 into the omnidirectional image.

Figure 22:
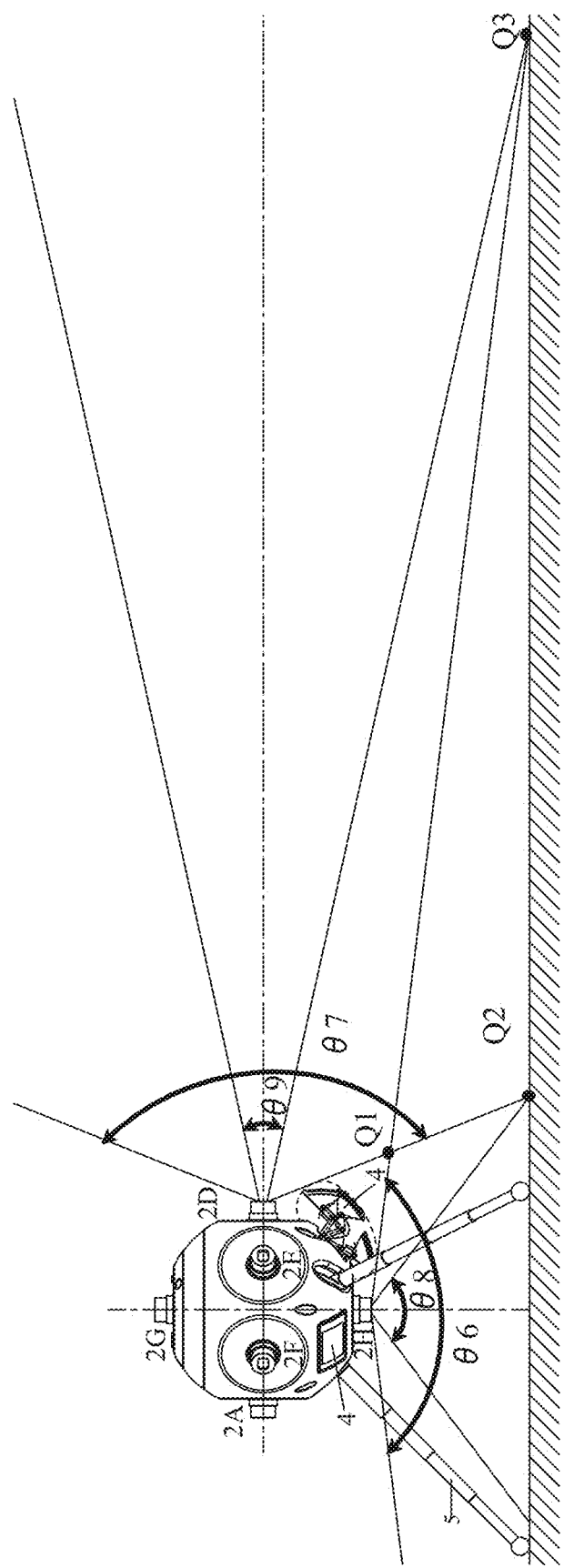
FIG. 22 illustrates a changeable range of the field angle of the lens barrel in the camera of Embodiment 1.

FIG. 22 illustrates the camera body 1 viewed from the arrow direction in FIG. 20 as in FIG. 21, and illustrates the entire camera body 1 including the tripod 5. As described above, further narrowing the field angles of the lens barrels 2D and 2H enables more surely avoiding the inclusion of the movable illumination unit 4 into their field angles. However, when performing image capturing of the area immediately below the camera body 1, a distance from the camera body 1 to the camera setting plane such as a floor or the ground (the camera setting plane is hereinafter referred to as "the ground") is short, so that it is necessary to consider an allowable range of the telephoto-side optical zoom operation of the lens barrel 2H. A most wide-angle-side field angle of the lens barrel 2D where the movable illumination unit 4 is not included is represented by θ7, and a point at which a lower edge of the field angle θ7 contacts the ground is represented by Q2. With these definitions, a most telephoto-side field angle of the lens barrel 2H is θ8 at which a lower edge of that field angle θ8 near the lens barrel 2D contacts the ground (that is, intersects with the field angle of the lens barrel 2D) at the point Q2.

Furthermore, a most wide-angle-side field angle of the lens barrel 2H where the movable illumination unit 4 is not included is represented by θ8, and a point at which a lower edge of that field angle θ8 near the lens barrel 2D contacts the ground is represented by Q3. With this definition, a most telephoto-side field angle of the lens barrel 2D is θ9 at which a lower edge of that field angle θ9 contacts the ground (that is, intersects with the field angle of the lens barrel 2H) at the point Q3.

When the omnidirectional image-capturing closest distance is set as short as possible, it is desirable to set the field angles of the lens barrels 2D and 2H respectively to θ7 and θ6 such that their field angles overlap each other at the point Q1.

However, when a specific object to be enlarged is included in the field angles of the lens barrels 2D and 2H, telephoto-side limitation field angles of the lens barrels 2D and 2H are respectively θ9 and θ8.

That is, in the state where the movable illumination unit 4 is protruded, the filed angle θD of the lens barrel 2D is settable in a range of:

$$\theta 9 < \theta D < \theta 7; \text{ and}$$

the filed angle θH of the lens barrel 2H is settable in a range of:

$$\theta 8 < \theta H < \theta 6.$$

Accordingly, as have been described with reference to FIG. 14, during the optical zoom operations of the lens barrels 2D and 2H in the above field angle ranges, consecutive (sequential) image capturing can be performed through the lens barrels 2D and 2H and through the other lens barrels 2A to 2C and 2E to 2G.

The field angle setting control depending only on the information indicating that the movable illumination unit 4 is protruded from the camera body 1 cannot set, even though the movable illumination unit 4 is located at the second position illustrated in FIG. 21, the omnidirectional image-capturing closest distance shorter than a distance to the point Q1. Therefore, it is desirable to be able to control the lens barrels 2D and 2H so as to change their field angles depending on the position of the movable illumination unit 4 between the first, second and third positions.

Specifically, the camera stores, in a memory in the camera body 1, inclusion patterns of the movable illumination unit 4 into any of the partial images acquired through the lens barrels 2D and 2H, and determines using a pattern recognition process whether or not an object included in the partial images is an object to be captured or the movable illumination unit 4.

Then, the camera automatically performs telephoto-side optical zoom operations of the lens barrels 2D and 2H until the movable illumination unit 4 disappears from the partial images acquired through the lens barrels 2D and 2H (that is, until the movable illumination unit 4 is not included in the field angles of all the lens barrels 2). Thereby, an omnidirectional image in which the movable illumination unit 4 is not included can be acquired. Controlling the field angles of the lens barrels 2D and 2H such that the movable illumination unit 4 is mostly not included therein (that is, such that the movable illumination unit 4 does not enter further inside than outer edge areas of the field angles) enables making the position corresponding to the omnidirectional image-capturing closest distance closer to the camera body 1 than the point Q1.

Although this embodiment described only the control of the field angles of the lens barrels 2D and 2H, similar control may be performed on the field angles of the lens barrels 2C and 2E in which the movable illumination unit 4 may be included.

In addition, similar control to that performed on the field angles of the lens barrels 2D and 2H may be performed when the other movable illumination units 4 provided between the lens barrels 2B and 2H and between the lens barrels 2F and 2H are protruded from the camera body 1.

Figure 23:
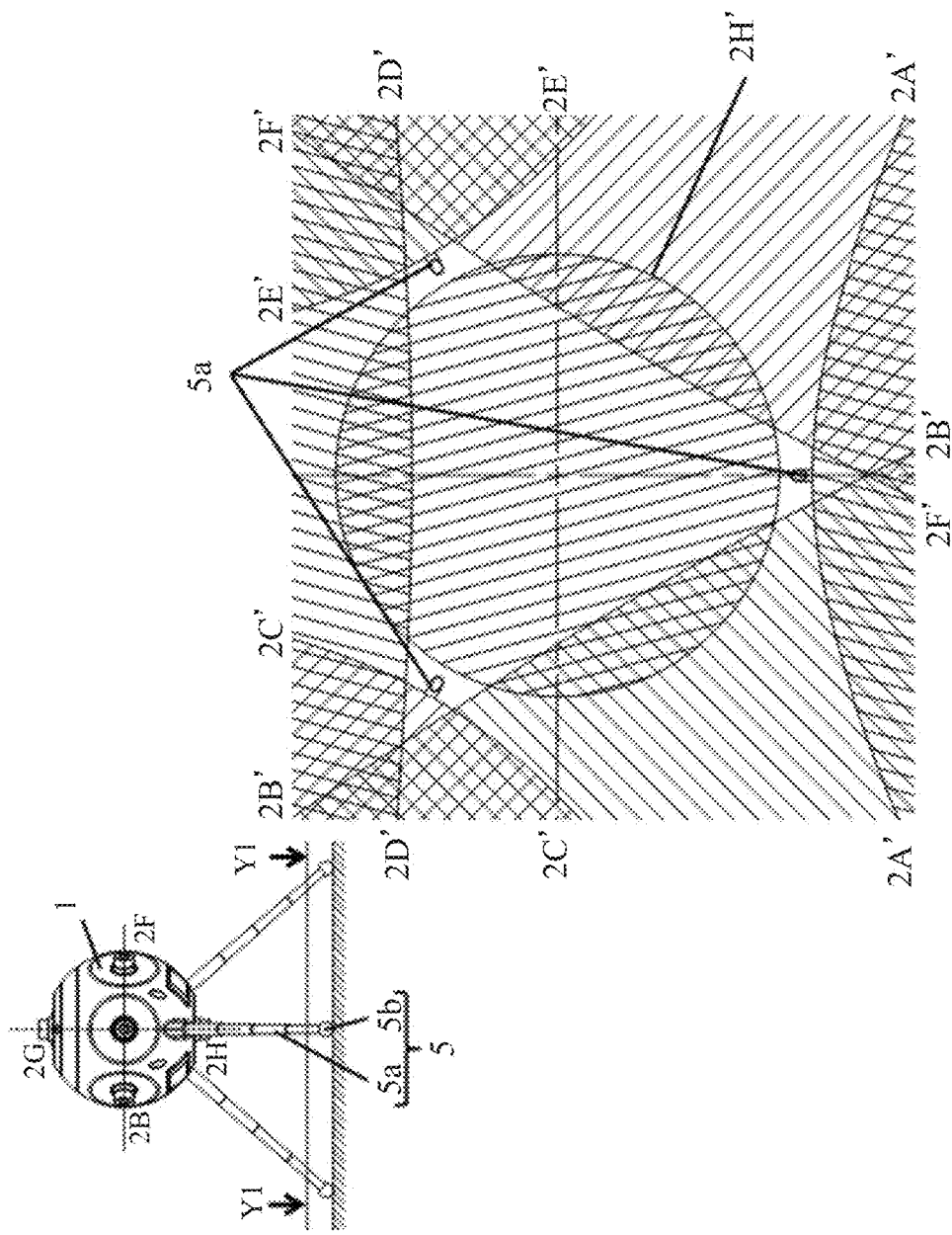
FIG. 23 illustrates legs of the tripod and the field angle of the lens barrel in the camera of Embodiment.

FIG. 23 illustrates field angles of the lens barrels 2A to 2F and 2H in a plane Y1 passing through the legs 5a in a state where the legs 5a of the tripod 5 are extended and the ground contact portions 5b contact the ground. The lens barrel 2G is used for image capturing in the sky direction, and therefore its field angle is not illustrated in FIG. 23. The field angles of the lens barrels 2A to 2H are set automatically by the field angle setting control. The field angles of the lens barrels 2A to 2F and 2H are indicated by curved lines 2A' to 2F' and 2H'. For example, an area further outside than the curved line 2A' indicates an area of the field angle of the lens barrel 2A. The field angle of the lens barrel 2H is an area surrounded by a central circle 2H'.

The legs 5a of the tripod 5 and therearound are not included in the field angle of all the lens barrels 2. That is, the field angle setting control is performed such that the legs 5a of the tripod 5 are not included in the field angles of all the lens barrels 2. This field angle setting control controls, as it is for the movable illumination units 4, the field angles of the respective lens barrels 2 such that the legs 5a of the tripod 5 are located near the outer edges of these field angles, and thereby prevents small areas around the legs 5a from being included in the field angles of all the lens barrels 2. This enables acquiring, even when the image capturing of the area immediately below the camera body 1 from which the legs 5a of the tripod 5 are extended is performed, an omnidirectional image not including the legs 5a of the tripod 5. In this case, the small areas around the legs 5a are actually not captured in the plane Y1. However, there is little case where the small areas include objects to be captured, so that it matters little that the small areas are not captured.

Figure 24:
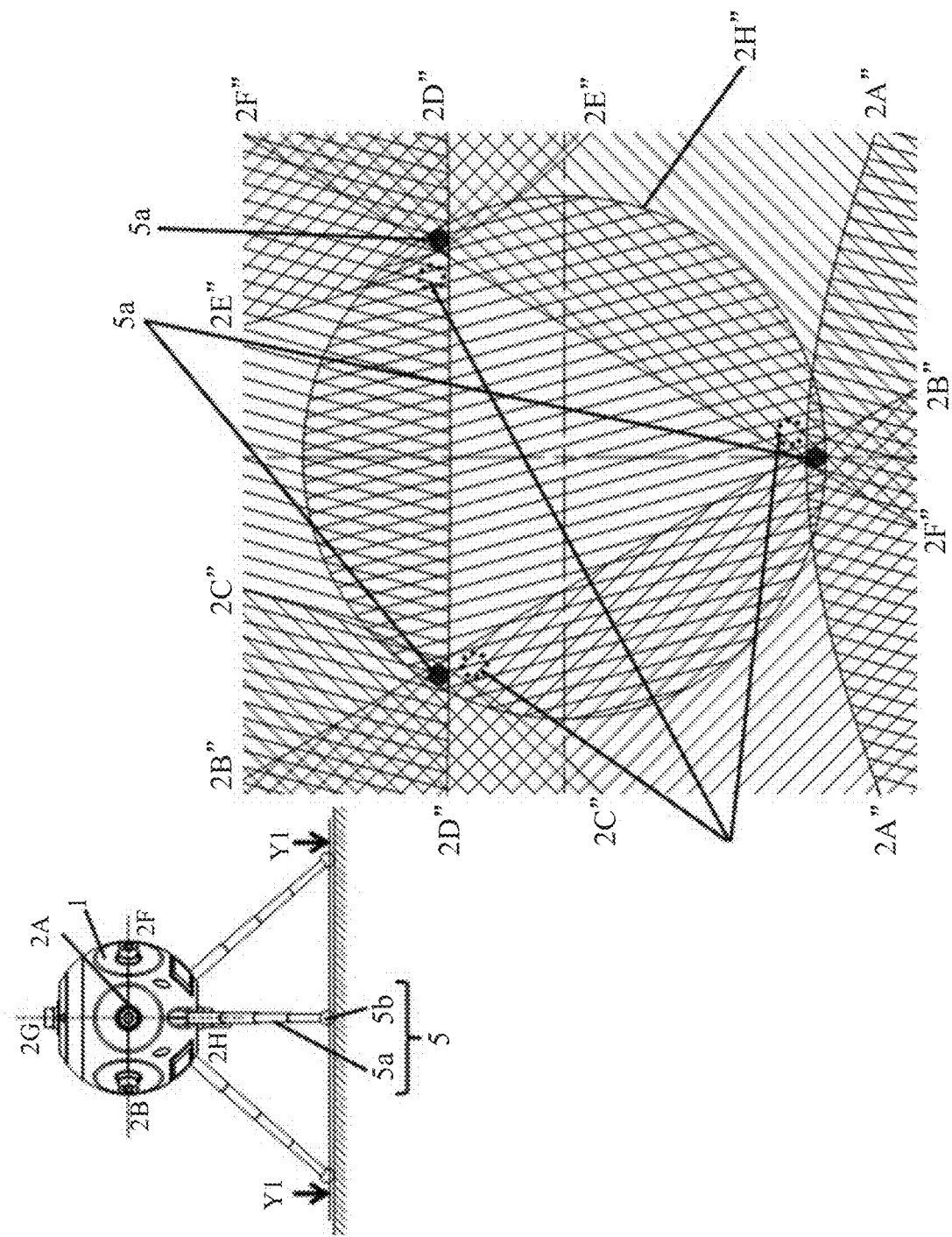
FIG. 24 illustrates ground contact portions of the tripod and the field angle of the lens barrel in the camera of Embodiment 1.

FIG. 24 illustrates field angles of the lens barrels 2A to 2F and 2H in a plane Y2 located slightly above the ground and passing through the ground contact portions 5b of the tripod 5 in the same state as illustrated in FIG. 23.

Also in FIG. 24, a field angle of the lens barrel 2G is not illustrated. Curved lines 2A" to 2F" and 2H" indicate areas corresponding to the field angles of the lens barrels 2A to 2F and 2H. For example, an outer area from the curved line 2A" indicates the field angle of the lens barrel 2A. The area surrounded by the central curved line (circle) 2H" indicates to the field angle of the lens barrel 2H.

The ground contact portions 5b are included in outer edge areas of the field angles of the lens barrels 2A to 2H, and are not included in areas inside from the outer edge areas. In other words, the ground contact portions 5b are included in only the outer edge areas of the field angles or in only outer edge areas of partial images acquired through the lens barrels 2A to 2H. Such setting of the field angles of the lens barrels 2A to 2H enables capturing objects near the ground contact portions 5b, and thereby enables acquiring an omnidirectional image including no field angle lack. For image areas including the ground contact portions 5b (hereinafter referred to as "ground contact portion image areas") in the omnidirectional image, the camera performs an image process to extract small images 5c near the ground contact portion image areas and then attach the extracted small images 5c to the ground contact portion image areas. Attaching the extracted small images 5c to the ground contact portion image areas corresponds to interpolating the ground contact portion image areas with the extracted small images 5c. The extracted small images 5c are parts of the omnidirectional image acquired by one image capturing, so that the image process is more simply than in a case where another image capturing is performed for acquiring images to be used for the interpolation.

It is desirable for the tripod 5, as it is for the movable illumination unit 4, to perform a field angle setting control depending on a protrusion amount (extension amount) of the legs 5a from the camera body 1. Specifically, the camera stores, in the memory in the camera body 1, inclusion patterns of the tripod 5 (the legs 5a and the ground contact portions 5b) into any of the partial images acquired through the lens barrels 2A to 2F and 2H, and determines using a pattern recognition process whether or not an object included in the partial images is the object to be captured or the tripod 5. Then, the camera automatically performs telephoto-side optical zoom operations of the lens barrels 2A to 2F and 2H until the tripod 5 disappears from the partial images acquired through the lens barrels 2A to 2F and 2H or until the tripod 5 is included only in the outer edge areas of the partial images. Thereby, an omnidirectional image in which the tripod 5 is entirely or almost not included can be acquired.

Alternately, instead of use of the pattern recognition process, the camera may detect a spread angle (from $\alpha$ to $\beta$ illustrated in FIG. 9) of the tripod 5 and the protrusion amount (extension amount) of the legs 5a, calculate field angles of the lens barrels 2A to 2F and 2H corresponding to the detected spread angle and extension amount, and perform the field angle setting control depending on a result of the calculation.

In this embodiment, since a lot of images are needed for interpolating the image areas including the ground contact portions 5b, the camera sets the field angles of the lens barrels 2 such that the ground contact portions 5b are included in the outer edge areas of the field angles. When the ground has not an evenly low contrast, but has a contrast such as a floor on which a painting is drawn using tiles, if colors of areas of the floor to which the tripod 5 contacts are different from actual colors, a feeling of strangeness is generated. Therefore, it is desirable to increase the number of selectable images for the interpolation. However, it is only necessary that each of the ground contact portions 5b be included in the outer edge area of the field angle of at least one of the lens barrels 2.

Furthermore, as it is illustrated in FIG. 23, a setting may be made such that the field angles of the lens barrels 2A to 2F and 2H do not include the ground contact portions 5b, and such that areas outside the field angles may be interpolated by their neighboring images.

In this embodiment, the camera performs image capturing in the state where the lens barrels 2 are further protruded from the camera body 1, compared with the retracted state (non-image-capturing state). This is desirable because, as start points of the field angles of the lens barrels 2 are further away from the camera body 1, narrower field angles can eliminate or reduce the inclusion of the movable illumination unit 4 or tripod 5 protruded from the camera body 1 into the field angles of the lens barrels 2.

In addition, although this embodiment described the case where the protruding members are the movable illumination unit 4 and tripod 5 retractable in the camera body 1, the protruding member may be an external accessory such as an external flash, an external microphone, an external tripod, a lens hood and a lens filter. In this case, since it is difficult for the camera to detect a protrusion amount of the external accessory and to perform the field angle setting control depending on a result of the detection, it is desirable to perform a field angle setting process using a pattern recognition process in which inclusion patterns of the external accessory attached to the camera body 1 are stored.

Figure 18:
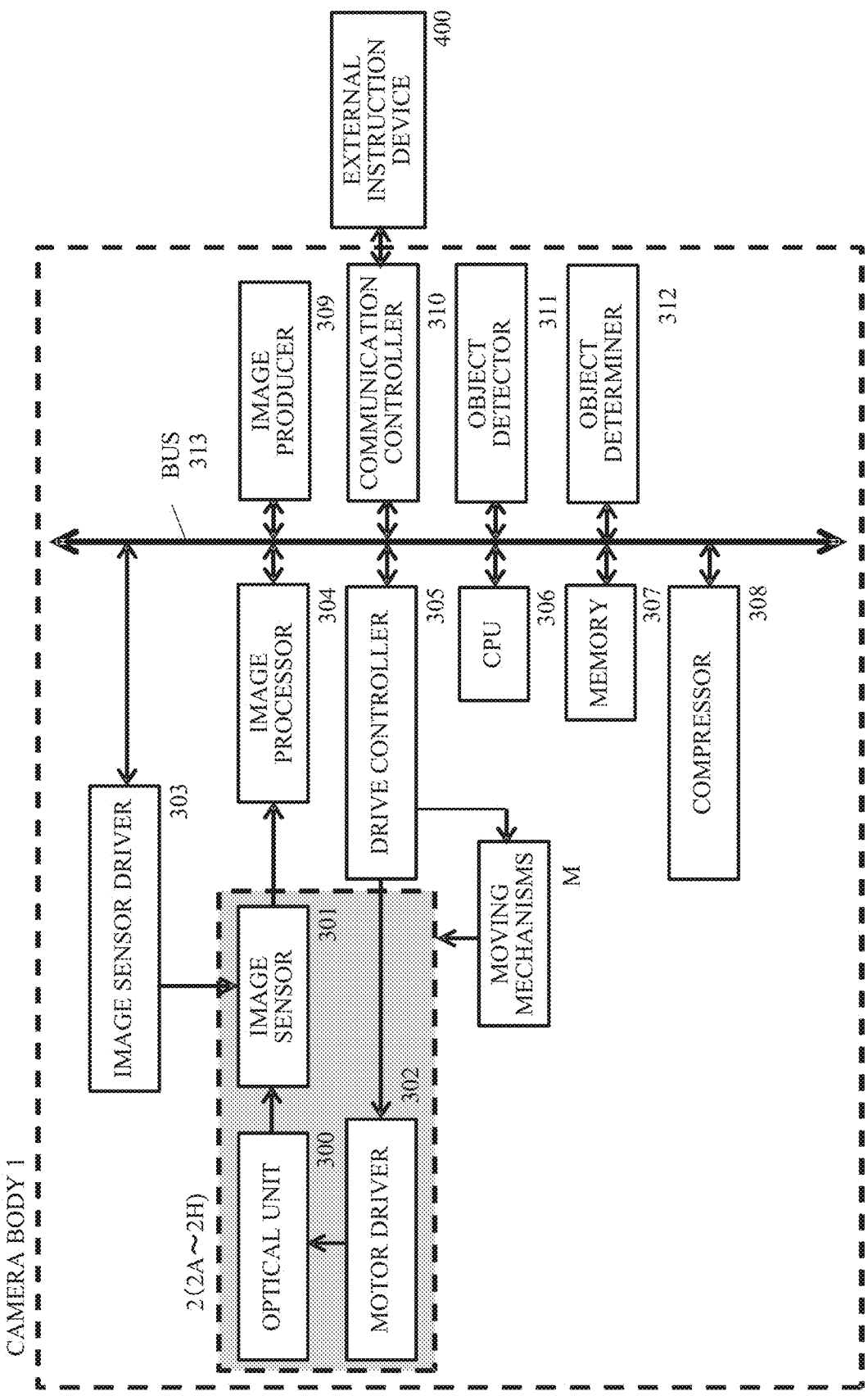
FIG. 18 is a block diagram illustrating a configuration of an omnidirectional image-capturing system including the camera of Embodiment 1.

FIG. 18 illustrates a system configuration of the camera body 1. Each of the lens barrels 2 (2A to 2H) includes an optical unit 300 (first to third lens holding barrels 21, 23 and 26), an image sensor 301 and a motor driver 302 including the drive motor 29. The optical unit 300 is moved in the optical axis direction by the motor driver 302. A movement amount of the optical unit 300 by the motor driver 302 is transmitted as a control signal from α CPU 306 as a main controller to the motor driver 302 through a drive controller 305. In addition, each lens barrel 2 is provided with the moving mechanism M illustrated in FIG. 17.

An object image formed by the optical unit 300 is converted into an electronic signal by the image sensor 301 driven by an image sensor driver 303. The CPU 306 controls the drive of the image sensor 301 through the image sensor driver 303.

An image processor 304 as an image producer performs A/D conversion of analog image-capturing signals output from the image sensors 301 of the respective lens barrels 2, and performs, on partial images as A/D converted digital image-capturing signals, the brightness correction depending on the F-numbers corresponding to the zoom positions of the respective lens barrels 2. The image processor 304 serves as the brightness corrector. Furthermore, the image processor 304 performs, on the partial images acquired through the respective lens barrels 2, image processes such as tone correction and white balance. The lens barrels 2 (2A to 2H), the image sensors 301 provided in the lens barrels 2 and the image processor 304 constitute an image-capturing device.

An image producer 309 performs the stitching process on the partial images produced through the eight lens barrels 2 by the image processor 304 to produce an omnidirectional image. The image producer 309 serving as a contrast detector detects the contrasts of the respective partial images, and determines the high contrast area and the low contrast area in each of the partial images. The CPU 306 causes the lens barrels 2, depending on a result of the determination, to perform the optical zoom operations necessary for causing the low contrast areas to include the stitching portions of the partial images.

A memory 307 is constituted by a volatile or non-volatile memory. The memory 307 temporarily stores image capturing data of the partial images and the omnidirectional images and stores processing programs to be executed by the CPU 306. The memory 307 further stores data indicating inclusion patterns of the movable illumination unit 4 and the tripod 5 into any of the partial images.

A compressor 308 compresses and encodes the image-capturing data according to an encoding method such as JPEG. A communication controller 310 transmits the compressed and encoded image-capturing data to external devices (not illustrated).

The image producer 309 performing the stitching process to produce the omnidirectional image is not necessarily to be provided in the camera. That is, a configuration may be employed that the camera sends the image-capturing data of the partial images through the communication controller 310 to an external image producing device (not illustrated) such as a personal computer and that the external image producing device produces the omnidirectional image.

An object detector 311 and an object determiner 312 recognize a specific object to be enlarged in the omnidirectional image, and determine the lens barrel 2 through which the specific object is captured. The CPU 306 causes, depending on a result of the above determination, the lens barrel (specific lens barrel) 2 through which the specific object is captured to perform a telephoto-side optical zoom operation, and causes the lens barrels 2 adjacent to the specific lens barrel 2 to perform wide-angle-side optical zoom operations.

The CPU 306 receives, through wired or wireless communication through the communication controller 310, input of a command that instructs the telephoto-side optical zoom operation of the specific lens barrel 2 from an external instruction device 400 such as a personal computer or a smartphone. The CPU 306 causes, in response to the command, the specific lens barrel 2 to perform the telephoto-side optical zoom operation, and causes the lens barrels 2 adjacent to the specific lens barrels 2 to perform the wide-angle-side optical zoom operations. Thereby, an omnidirectional image-capturing system including the omnidirectional camera and the external instruction device 400 is constituted.

Figure 19:
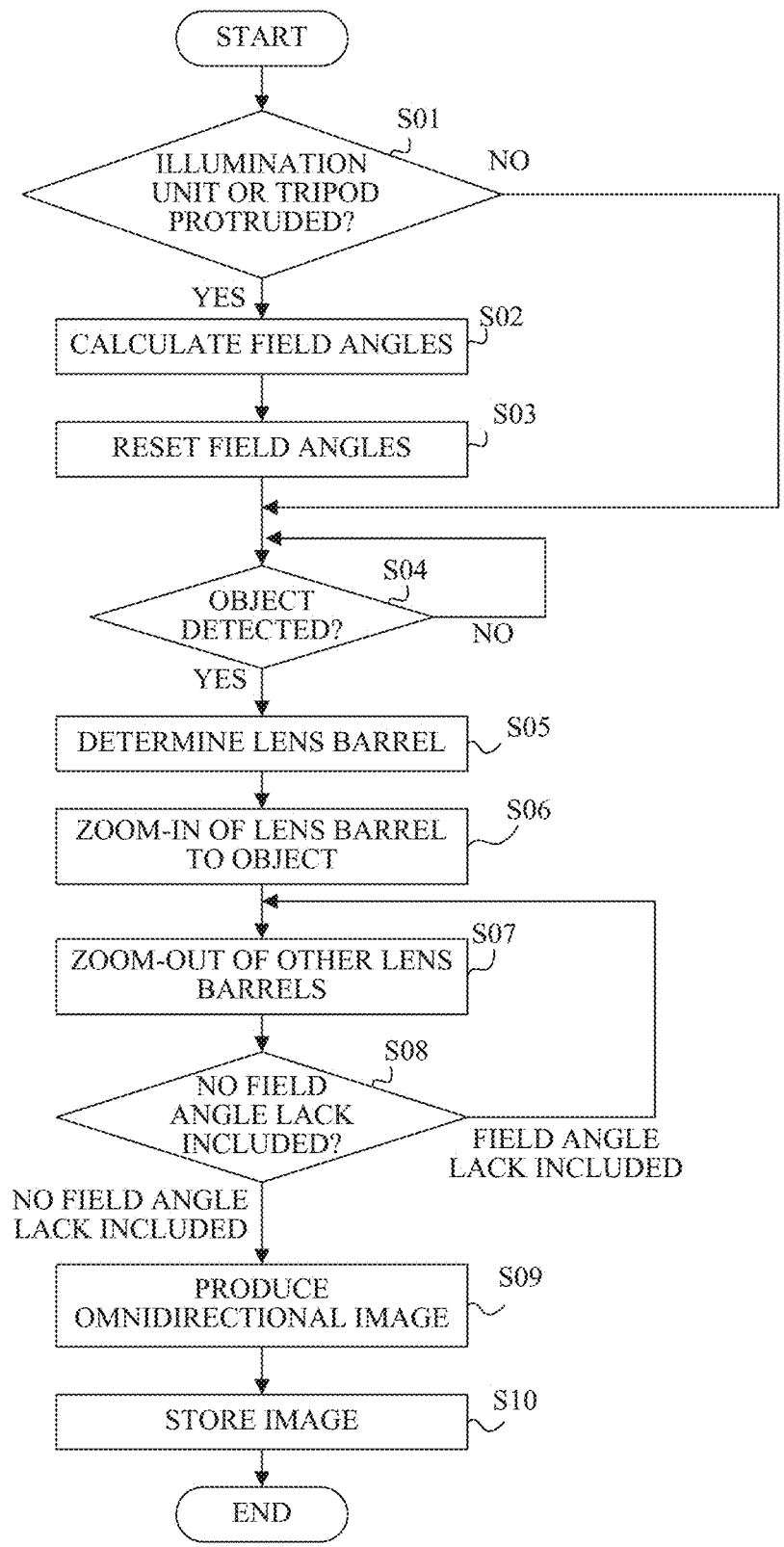
FIG. 19 is a flowchart illustrating an image-capturing control process performed by the camera of Embodiment 1.

FIG. 19 illustrates a flowchart of a process (image-capturing control method) for the above-described field angle setting control. The CPU 306 as a computer executes the image-capturing control process according to an image-capturing program as a computer program.

At step S01, the CPU 306 as a protrusion detector determines whether or not at least one of the movable illumination unit 4 and the tripod 5 as the protruding members is protruded from its retracted state. Specifically, the CPU 306 reads out from the memory 307 data indicating the inclusion patterns of the movable illumination unit 4 and the tripod 5 into any of the partial images. Furthermore, the CPU 306 performs pre-image capturing in a field angle setting of the lens barrels 2A to 2F and 2H in the activated state of the camera. Then, the CPU 306 performs the pattern recognition process using the data indicating the appearance patterns on the partial images acquired through the lens barrels 2A to 2F and 2H. If the pattern recognition process detects the appearance of the protruding member in the partial images, the CPU 306 determines that the protruding member is protruded from the retracted state to proceed to step S02, and otherwise determines that the protruding member is not protruded to proceed to step S04. At this step S01, the CPU 306 acquires the spread angle and the extension amount of the legs 5a of the tripod 5 if possible.

At step S02, the CPU 306 calculates the field angles of the lens barrels 2A to 2F and 2H such that the protruded movable illumination unit 4 or tripod 5 is not included in the partial images acquired through the lens barrels 2A to 2F and 2H or is included only in the outer edge areas of these partial images. The field angles calculated at this step are the same field angles as or narrower (further telephoto-side) field angles than those in the activated state.

Next at step S03, the CPU 306 causes at least one of the lens barrels 2A to 2F and 2H, whose field angle calculated at step S02 is different from that in the activated state to perform a telephoto-side optical zoom operation. That is, the CPU 306 resets the field angles of the lens barrels 2A to 2F and 2H. At this step, the CPU 306 controls the moving mechanism M provided for the at least one lens barrel 2 performing the telephoto-side optical zoom operation such that the nodal point thereof is located on the circle C on which the nodal points of the other lens barrels 2 are located.

At step S04, the CPU 306 performs omnidirectional image capturing to acquire an omnidirectional image. Then, the CPU 306 determines whether or not the object detector 311 has detected the specific object P such as a person from the omnidirectional image. If the object detector 311 has not detected the specific object P, the CPU 306 repeats the determination at step S04. If the object detector 311 has detected the specific object P, the CPU 306 proceeds to step S05 to cause the object determiner 312 to determine, of the eight lens barrels 2 (2A to 2H), the lens barrel 2 (hereinafter, the lens barrel 2A) capturing the detected specific object P. An example of the specific object P is an object satisfying a predetermined detection condition and is automatically detected from the omnidirectional image.

Next at step S06, the CPU 306 causes, through the drive controller 305, the lens barrel 2A to perform a telephoto-side optical zoom (zoom-in) operation. The CPU 306 causes the lens barrel 2A to perform the zoom-in operation such that the specific object P is captured as large as possible in the field angle of the lens barrel 2A. Furthermore, at step S07, the CPU 306 causes the lens barrels 2B, 2F, 2G and 2H adjacent to the lens barrel 2A through the drive controller 305 to perform wide-angle-side optical zoom (zoom-out) operations. Thereby, the narrowed field angle of the lens barrel 2A having performed the zoom-in operation is compensated for. The CPU 306 calculates zoom-out amounts of the lens barrels 2B, 2F, 2G and 2H so as to satisfy the above-described omnidirectional image-capturing closest distance L2. Moreover, at steps S06 and S07, the CPU 306 controls, with the optical zoom operations of the lens barrels 2A, 2B, 2F, 2G and 2H, the moving mechanisms M provided for these lens barrels 2B, 2F, 2G and 2H such that their nodal points are located on the identical circle.

Next at step S08, the CPU 306 determines whether or not an omnidirectional image including no field angle lack is acquirable. The field angle lack is generated when the lens barrels 2B, 2F, 2G and 2H cannot perform optical zoom operations satisfying the omnidirectional image-capturing closest distance L2 or when the field angles of the lens barrels 2B, 2F, 2G and 2H do not overlap part of the field angle of the lens barrel 2A at the infinite distance. If the acquirable omnidirectional image includes the field angle lack, the CPU 306 returns to step S07 to cause the lens barrels 2B, 2F, 2G and 2H to further perform the zoom-out operations, and repeats this step until an omnidirectional image including no field angle lack is acquired. On the other hand, if acquirable omnidirectional image includes no field angle lack, the CPU 306 proceeds to step S09.

At step S09, the CPU 306 causes the image producer 309 to perform the stitching process of the eight partial images produced by the image processor 304 to produce an omnidirectional image. Then, at step S10, the CPU 306 stores the omnidirectional image to the memory 307, and ends this process.

Embodiment 2

Embodiment 1 described the case where the field angle setting control is performed such that the protruded movable illumination unit 4 or tripod 5 is not included in the partial images acquired through the lens barrels 2A to 2F and 2H or is included only in the outer edge areas of these partial images.

Embodiment 2 will describe a case where, when there is a scene necessary to be captured rather than avoiding the inclusion of the movable illumination unit 4 or tripod 5 into any of the partial images, the field angle setting control is performed so as to allow the inclusion while reducing it as small as possible.

Figure 25:
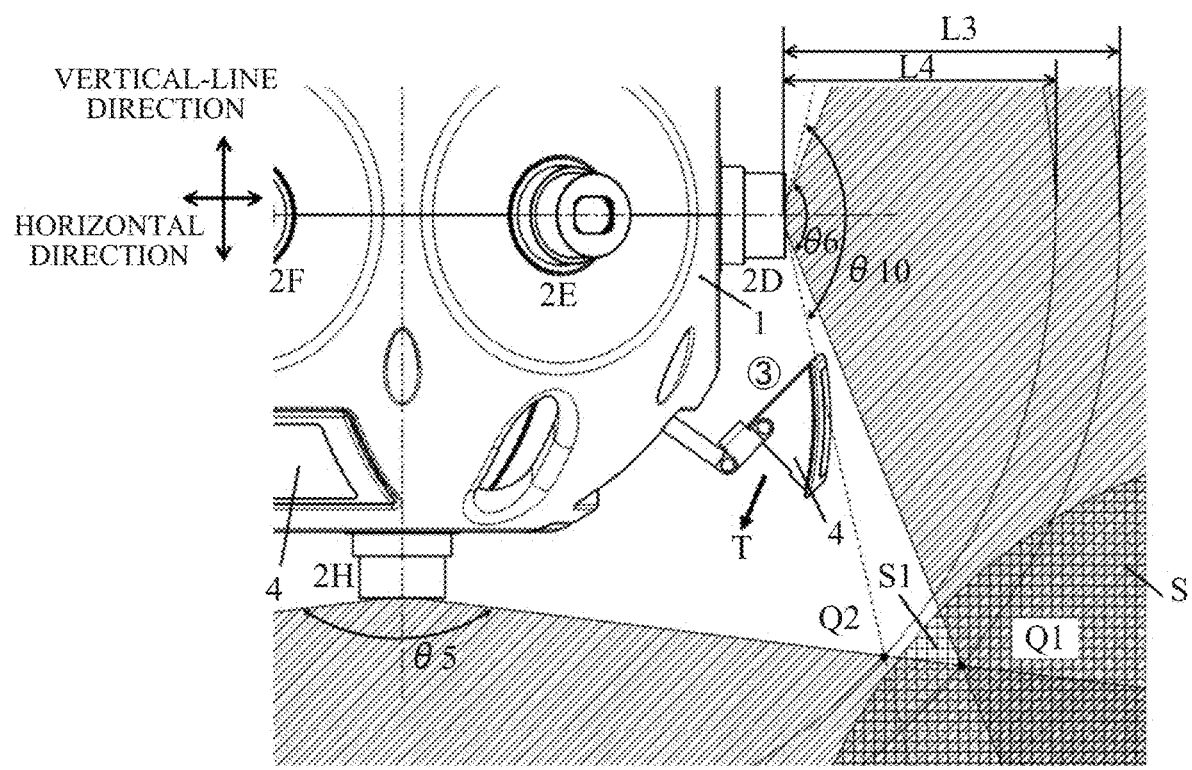
FIG. 25 illustrates a state where the illumination unit in FIGS. 21 and 22 are set to a third position in Embodiment 2 of the present invention.

FIG. 25 illustrates a state where the movable illumination unit 4 illustrated in FIGS. 21 and 22 is located at a position indicated by the circled 3. As described above, the field angle of the lens barrel 2D is set to θ6 and the field angle of the lens barrel 2H is set to θ5, thereby avoiding the inclusion of the movable illumination unit 4 into these field angles.

The omnidirectional image-capturing closest distance L3 in this state is, as illustrated in FIG. 25, a distance from the front edge of the lens barrel 2D (or 2H) to a circular arc including a point Q1 at which the field angles of the lens barrels 2D and 2H intersect with each other. Even if there is, near the camera body 1, an object S whose image is necessary to be acquired as part of an omnidirectional image, the object S is located further inside than the omnidirectional image-capturing closest distance L3, so that a portion S1 of the object S is not included in the field angles of the lens barrels 2D and 2H, which results in a lack thereof in the acquired (captured) image. In this case, when a user desires to acquire a captured image of the entire object S while allowing the inclusion of the movable illumination unit 4 in the captured image, changing the omnidirectional image-capturing closest distance L3 to L4 enables capturing the object S without its lack. Specifically, the lens barrel 2D enlarges its field angle from θ6 to θ10, and the lens barrel 2H maintains its maximum field angle θ5. Thereby, the omnidirectional image-capturing closest distance becomes L4 from the front edge of the lens barrel 2D (or 2H) to a circular arc including a point Q2 at which the field angles of the lens barrels 2D and 2H intersect with each other. However, as illustrated by a broken line, the movable illumination unit 4 is included in the enlarged field angle θ10 of the lens barrel 2D, so that the movable illumination unit 4 is included in the captured image.

When the lens barrel 2D and the movable illumination unit 4 have a positional relation illustrated in FIG. 25, changing the position of the movable illumination unit 4 enables avoiding the inclusion thereof into the captured image. Furthermore, when it is necessary to acquire through the lens barrel 2D a captured image not including the movable illumination unit 4 rather than the captured image including the movable illumination unit 4 and the lack of the object S, an image process to return its field angle to the original one can be performed in the stitching process.

Figure 26:
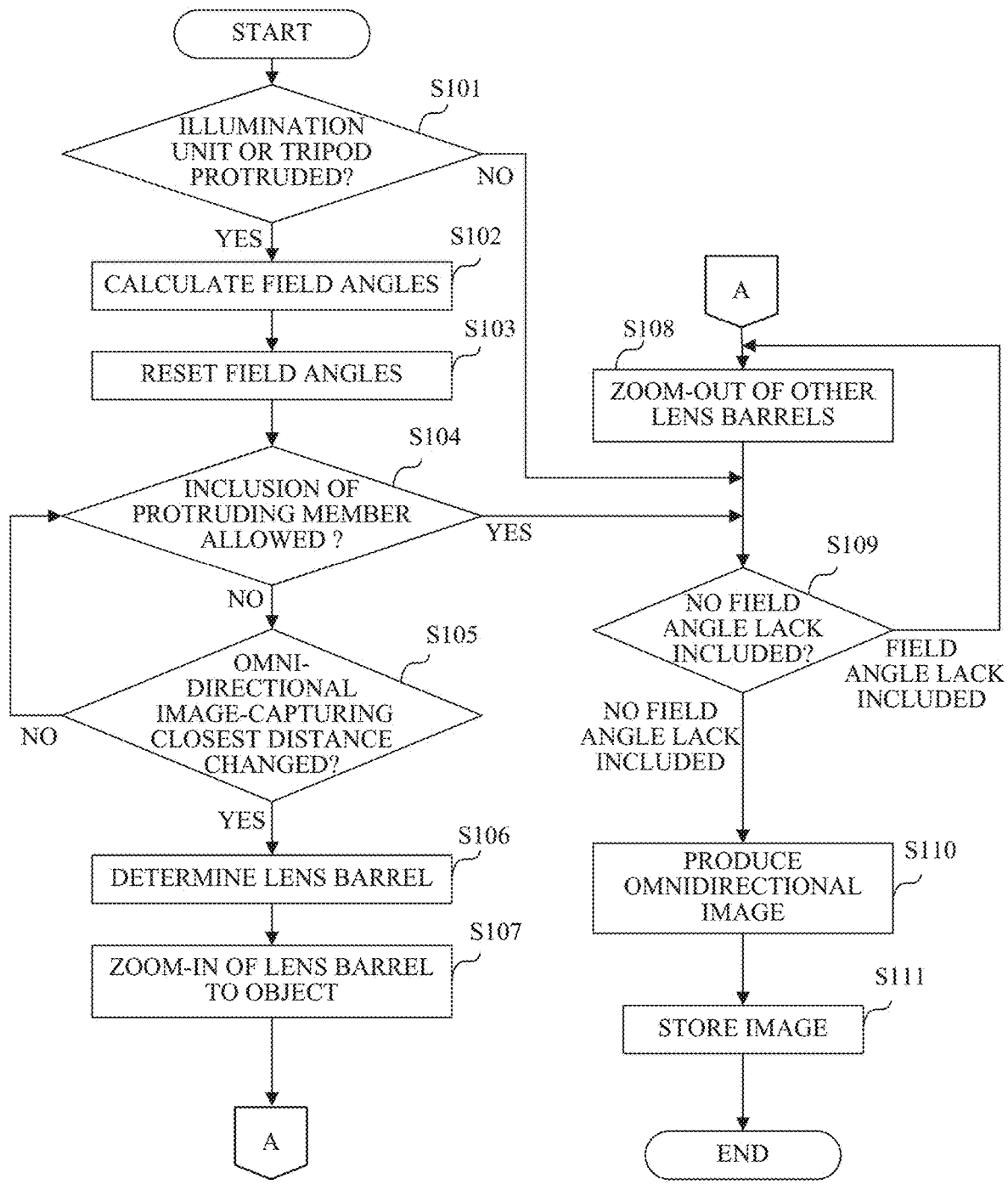
FIG. 26 is a flowchart of an image-capturing control process performed by the camera of Embodiment 2.

Next, with reference to a flowchart of FIG. 26, description will be made of settings of a process performed by the CPU 306 in this embodiment.

At step S101, the CPU 306 as the protrusion detector detects whether or not at least one of the movable illumination unit 4 and the tripod 5, which are the protruding members, is protruded from its retracted state. The specific detection method is as described at step S01 in Embodiment 1. The CPU 306 proceeds to step S102 if the protruding member is protruded, and otherwise proceeds to step S109.

At step S102, the CPU 306 calculates the field angles of the lens barrels 2A to 2F and 2H when the protruded movable illumination unit 4 or tripod 5 is not included in the partial images acquired through the lens barrels 2A to 2F and 2H, and calculates the field angles thereof when the protruded movable illumination unit 4 or tripod 5 is included in the partial images.

Next at step 3103, the CPU 306 causes at least one of the lens barrels 2A to 2F and 2H, whose field angle calculated at step S102 is different from that in the activated state, to perform a telephoto-side optical zoom operation.

At step S104, the CPU 306 checks a user's preset setting for the inclusion of the protruding member into the field angles of the lens barrels 2A to 2F and 2H. If the user's preset setting is allowing the inclusion, the CPU 306 proceeds to step S109, and on the other hand, if the user's preset setting is not allowing the inclusion, the CPU 306 proceeds to step S105. When detecting the inclusion, the CPU 306 may output a warning for the user and cause the user to select the setting thereat.

At step S105, the CPU 306 checks a setting on the omnidirectional image-capturing closest distance depending on the field angles of the lens barrels 2A to 2H. The CPU 306 proceeds to S106 when determining that, at the user's preset omnidirectional image-capturing closest distance, the protruded movable illumination unit 4 or tripod 5 is included in the partial images and changing, with a warning to the user, the omnidirectional image-capturing closest distance to one at which the protruded movable illumination unit 4 or tripod 5 is not included in the partial images. When the user does not allow the inclusion of the protruding member and does not desire the change of the omnidirectional image-capturing closest distance, the CPU 306 returns to step S104 to check again the user's setting of the inclusion of the protruding member. The CPU 306 repeats S104 to S108 and thereby causes the user to select changing the omnidirectional image-capturing closest distance to the telephoto side. A priority put on the allowance of the inclusion of the protruding member or the change of the omnidirectional image-capturing closest distance may be predetermined.

Steps S106 to Sill are the same as steps S05 to S10, so that their description is omitted.

As described above, this embodiment checks whether the user allows the inclusion of the protruding member into any of the partial images such that the protruding member covers the entire object S near the camera body 1 or whether the user changes the omnidirectional image-capturing closest distance to one at which the protruding member is not included in the partial images. This enables providing various user-desired scenes to be captured, which enables increasing a freedom degree of image capturing. Furthermore, when the inclusion of the protruding member into any of the partial images cannot be avoided, this embodiment controls the field angles of the lens barrels 2A to 2F and 2H so as to reduce the inclusion as little as possible.

This embodiment allows the inclusion of the protruding member into the finally joined omnidirectional image when the inclusion thereof is allowed. However, even though the protruding member is included in any of the partial images acquired through the lens barrels 2A to 2F and 2H, the inclusion may be eliminated by joining the partial images so as not to include the protruding member or by performing the above-described image process.

The above embodiments described the case where, as an example, each lens barrel has three-lens magnification-variable optical system including the three lens units. However, as other examples, other magnification-variable optical systems than the three-lens magnification-variable optical system may be used.

Each of the embodiments described above enables simultaneously providing, by using a single camera, a wide-field image and a high-quality enlarged image of an object included in the wide-field image. Furthermore, each of the embodiments described above enables providing an image-capturing apparatus capable of individually performing wide-field-angle image capturing while eliminating or reducing an inclusion of a protruding member into a captured image.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2017-066490, filed on Mar. 30, 2017, and 2018-030883, filed on Feb. 23, 2018 which are hereby incorporated by reference herein in their entirety.

What is claimed is:

1. An image-capturing apparatus comprising:
   an image-capturing device configured to perform image capturing through multiple magnification-variable optical systems, which face in mutually different directions, to acquire multiple images to be continuously joined together;
   a field angle setter configured to control magnification-varying operations of the respective magnification-variable optical systems to set field angles thereof;
   a nodal point controller configured to control nodal points of the multiple magnification-variable optical systems so as to make parallaxes between the multiple images acquired through the multiple magnification-variable optical systems approximately identical to one another even though the multiple magnification-variable optical systems are set to mutually different zoom positions;
   a main body holding the multiple magnification-variable optical systems; and
   a protrusion detector configured to detect a protruding member,
   wherein the field angle setter is configured to perform, depending on a detection result of the protrusion detector, a field angle setting process for setting the field angles of the respective magnification-variable optical systems such that the detected protruding member is not included in all the field angles of the magnification-variable optical systems.

2. The image-capturing apparatus according to claim 1, wherein the protrusion detector is configured to detect that the protruding member is included in any one or more of the multiple images.

3. The image-capturing apparatus according to claim 1, wherein the protruding member emits an illumination light.

4. The image-capturing apparatus according to claim 1, wherein the protruding member is a tripod for supporting the main body.

5. The image-capturing apparatus according to claim 4, wherein the controller is configured to perform the field angle setting process depending on at least one of a spread angle of multiple legs of the tripod and an extension amount of the legs.

6. The image-capturing apparatus according to claim 1, wherein the respective magnification-variable optical systems are retracted in the main body when image capturing is not performed, and are protruded from the main body when the image capturing is performed.

7. An image-capturing apparatus comprising:
- an image-capturing device configured to perform image capturing through multiple magnification-variable optical systems, which face in mutually different directions, to acquire multiple images to be continuously joined together;
  - a field angle setter configured to control magnification-varying operations of the respective magnification-variable optical systems to set field angles thereof;
  - a nodal point controller configured to control nodal points of the multiple magnification-variable optical systems so as to make parallaxes between the multiple images acquired through the multiple magnification-variable optical systems approximately identical to one another even though the multiple magnification-variable optical systems are set to mutually different zoom positions;
- a main body holding the multiple magnification-variable optical systems; and
- a protrusion detector configured to detect a protruding member,
- wherein the field angle setter is configured to perform, depending on a detection result of the protrusion detector, a field angle setting process for setting the field angles of the respective magnification-variable optical systems so as to reduce an included amount of the detected protruding member in any one or more of the field angles of the magnification-variable optical systems.

8. An image-capturing control method for performing image capturing through multiple magnification-variable optical systems, which face in mutually different directions, to acquire multiple images to be continuously joined together, the method comprising the steps of:
- controlling magnification-varying operations of the respective magnification-variable optical systems to set field angles thereof;
- controlling nodal points of the multiple magnification-variable optical systems so as to make parallaxes between the multiple images acquired through the multiple magnification-variable optical systems approximately identical to one another even though the multiple magnification-variable optical systems are set to mutually different zoom positions: and
- detecting a protruding member,
- wherein, in the step of setting the field angles, the method performs, depending on a detection result of the detecting step, a field angle setting process for setting the field angles of the respective magnification-variable optical systems such that the detected protruding member is not included in all the field angles of the magnification-variable optical systems.

9. A non-transitory storage medium storing a computer program that causes a computer in an image-capturing apparatus to perform a process,
- the image-capturing apparatus being configured to perform image capturing through multiple magnification-variable optical systems, which face in mutually different directions, to acquire multiple images to be continuously joined together, the process comprising the steps of:
- controlling magnification-varying operations of the respective magnification-variable optical systems to set field angles thereof;
- controlling nodal points of the multiple magnification-variable optical systems so as to make parallaxes between the multiple images acquired through the multiple magnification-variable optical systems approximately identical to one another even though the multiple magnification-variable optical systems are set to mutually different zoom positions: and
- detecting a protruding member,
- wherein, in the step of setting the field angles, the process performs, depending on a detection result of the detecting step, a field angle setting process for setting the field angles of the respective magnification-variable optical systems such that the detected protruding member is not included in all the field angles of the magnification-variable optical systems.

* * * * *